United States Patent [19]
Kuwahara

[11] Patent Number: 6,092,862
[45] Date of Patent: Jul. 25, 2000

[54] FLOOR STRUCTURE FOR TRUCK'S LOAD-CARRYING PLATFORM

[75] Inventor: Tohru Kuwahara, Kawasaki, Japan

[73] Assignees: Isuzu Motors Limited; Toray Industries Inc., both of Tokyo, Japan

[21] Appl. No.: 08/854,431

[22] Filed: May 12, 1997

[30] Foreign Application Priority Data

May 14, 1996 [JP] Japan .................................. 8-119162
Sep. 12, 1996 [JP] Japan .................................. 8-242214

[51] Int. Cl.[7] ....................................................... B60P 9/00
[52] U.S. Cl. ........................... 296/182; 296/204; 296/901
[58] Field of Search ........................... 296/901, 181–183, 296/204

[56] References Cited

U.S. PATENT DOCUMENTS

| | | | |
|---|---|---|---|
| 2,297,198 | 9/1942 | Borgward | 296/204 |
| 5,403,063 | 4/1995 | Sjostedt et al. | 296/901 |
| 5,730,485 | 3/1998 | Sjostedt et al. | 296/182 |

FOREIGN PATENT DOCUMENTS

| | | | |
|---|---|---|---|
| 181202 | 2/1955 | Austria | 296/182 |
| 0061919 | 10/1982 | European Pat. Off. . | |
| 334450 | 9/1989 | European Pat. Off. | 296/901 |
| 0635418 | 1/1995 | European Pat. Off. . | |
| 0787643 | 8/1997 | European Pat. Off. . | |
| 679917 | 10/1966 | France . | |
| 434919 | 5/1948 | Italy | 296/204 |
| 135374 | 7/1985 | Japan | 296/204 |
| 606946 | 8/1948 | United Kingdom | 296/183 |

OTHER PUBLICATIONS

European Search Report of Application No. 97 107 872.0 filed Aug. 31, 1995.
Patent Abstracts of Japan Application No. 51054388 filed May 14, 1976, Entitled "Floor Plate of Luggage Carrier for Vehicle".

*Primary Examiner*—Dennis H. Pedder
*Attorney, Agent, or Firm*—Rader, Fishman & Grauer PLLC

[57] ABSTRACT

A floor structure (1) for a load-carrying platform of a truck. The truck has a pair of parallel side rails (3) extending in a longitudinal direction of the truck. The floor structure (1) includes a floor panel part (2) made from a fiber reinforced plastic (5) and a pair of longitudinal sills (4) extending along the pair of side rails (3) under the floor panel part (2) and made from the fiber reinforced plastic (5). The floor panel part (2) is thicker in a first area (11, T1) (111, T3) between the longitudinal sills (4) than in second and third areas (12, T2) (112, T4) outside the first area.

12 Claims, 21 Drawing Sheets

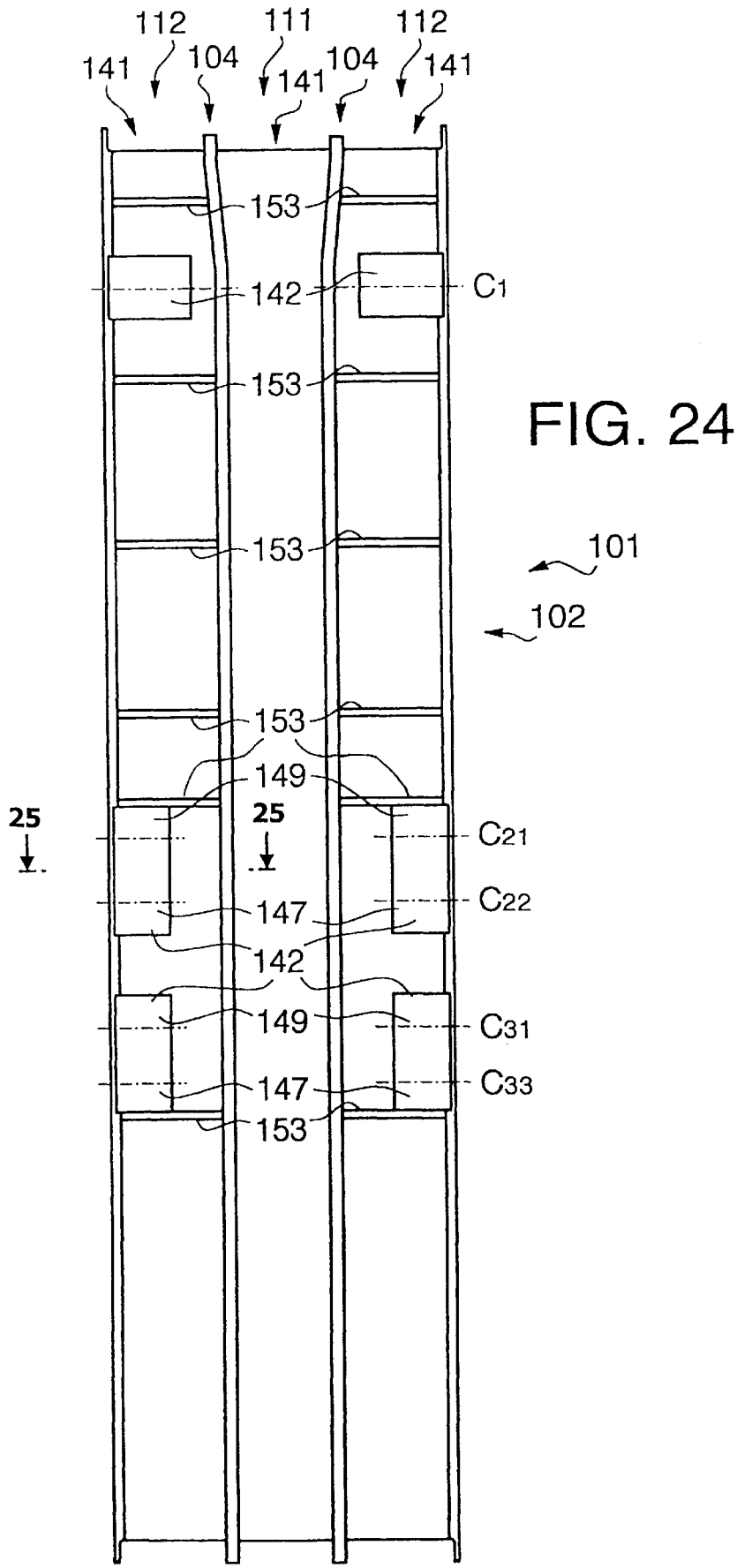

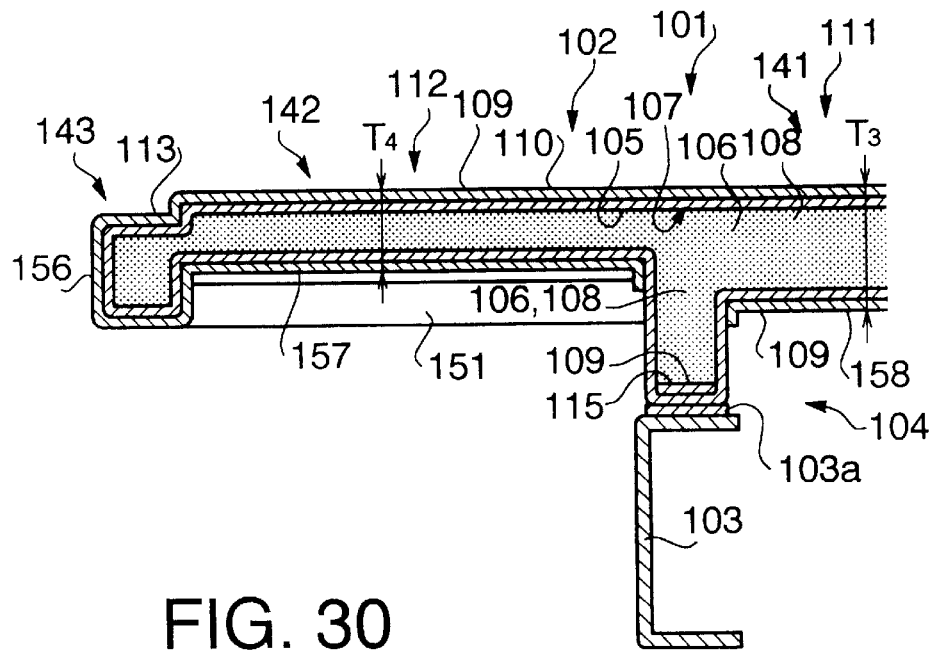
FIG. 30
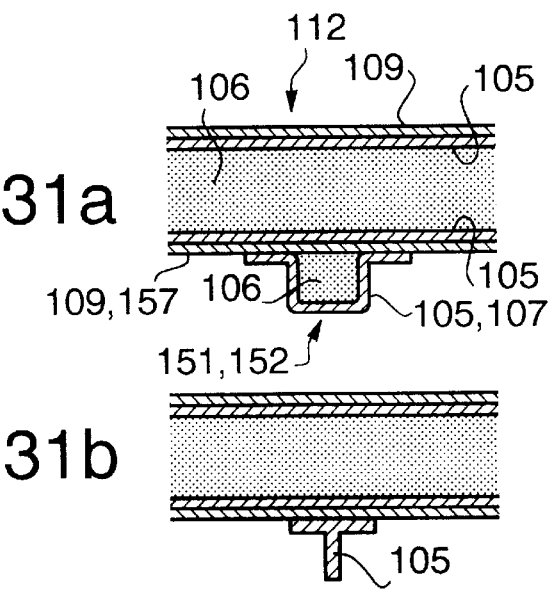
FIG. 31a
FIG. 31b
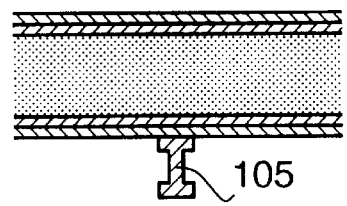
FIG. 31c
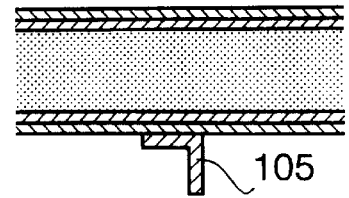
FIG. 31d

FLOOR STRUCTURE FOR TRUCK'S LOAD-CARRYING PLATFORM

BACKGROUND OF THE INVENTION

1. Technical Field

The present invention relates to a floor structure for a truck's load-carrying platform, and more particularly to a floor structure which is applicable to any type of load-carrying platform such as a van's platform (i.e., closed box-type platform), a platform which opens in three directions (e.g., a pick-up truck's platform), a platform equipped with a single gate which opens in a backward direction and a wing-body type platform which has one or more pairs of swing doors adapted to open like bird's wings in a width direction of a truck.

2. Background Art

Referring to FIG. 35 of the accompanying drawings, a wing body-type platform equipped with a single pair of swing doors or roofs 202 is illustrated as an example of typical truck's load-carrying platforms. This platform has relatively large dimensions and fixed on a frame work of a truck. The platform has gates 201 along lateral edges of the truck and the wing roofs 202 over the gates. At a rear end of the platform, provided is a pair of biparting rear doors 203. A front end of the platform is closed by a front wall 204. It should be noted that a cab (not shown) is situated in front of the front wall 204. The gates 201, wing roofs 202, rear doors 203 and front wall 204 are supported from a conventional floor structure 205 of the truck's platform respectively.

Referring to FIG. 36 of the accompanying drawings, illustrated is a perspective view of part of the floor structure 205 in an enlarged scale partly in cross section. The floor structure 205 is secured on a pair of side frames 206 (only one of them is depicted) of a ladder-like truck frame via spacers 207 by suitable fastening members such as U-bolts (not shown). The side frames 206 extend in a longitudinal direction of the truck. The floor structure 205 includes longitudinal sills or joists 208 extending along the side rails 206 and secured on the side rails 206, transversal sills 209 extending in a direction perpendicular to the longitudinal sills 208 across the width of the platform and secured on the longitudinal sills 208 and the floor plate 210 placed on the transverse sills 209. The floor plate 210 forms a platform floor. Each of the longitudinal and transversal sills 208 and 209 is a steel member having a U-shaped cross section. The longitudinal and transversal sills 208 and 209 form in combination a frame work to support the floor plate 210 which is situated on the frame work. The rigidity of the floor structure 205 is insured by this frame work. The floor plate 210 is generally made of wood.

As understood from FIG. 36, the conventional floor structure 205 is made by the longitudinal and transversal sills 208 and 209 assembled like a lattice and the floor plate 210 placed on them. Therefore, the floor structure 205 has a thickness Tz which is relatively Large. On the other hand, there is a strong demand for low floor trucks in an automobile industry. Loading and unloading becomes easier as the height of the platform floor from the ground becomes lower. In addition, the lower the floor, the larger a volume of the platform.

The conventional floor structure 205 is also heavy in weight since it includes the steel frame members 208 and 209 and the woody floor plate 210.

The floor structure 205 itself must have sufficient rigidity or strength since it helps insure or partly determines the truck's overall bending/flexural rigidity as well as torsional rigidity.

In general, a typical truck has wheels below the platform floor and outside the side rails of the truck's frame, and the wheels are frequently caused to move up and down due to projections and recesses on and in a road surface and/or cornering (or rolling) movements of the truck. Therefore, if the floor structure of the truck's platform is positioned at a lower height from the ground or road surface, the wheels may collide with the floor panel when the wheels move upward.

SUMMARY OF THE INVENTION

An object of the present invention is to provide a floor structure for a vehicle's platform which can eliminate the above-described problems which the prior art structure has.

According to one aspect of the present invention, there is provided a floor structure for a vehicle's load-carrying platform, comprising: a floor plate member to define a floor of a platform and a pair of longitudinal sills extending along a pair of side frame of the vehicle for supporting the floor plate member thereon. The floor plate member and the longitudinal sills are made to be hollow from a fiber reinforced plastic (FRP) respectively. The floor plate member and the longitudinal sills may be simultaneously manufactured as a one piece unit or may be separately prepared and jointed later. The hollow FRP floor structure reduces the weight of the floor structure but exerts high rigidity. The transversal sills are dispensed with from this floor structure so that the thickness of the floor structure is also reduced. Accordingly, it is possible to provide a platform having a lower floor. The longitudinal sills on which the floor plate member is supported insures sufficient bending/flexural rigidity as well as torsional rigidity of the vehicle.

The floor plate member under which wheels of the vehicle are positioned may be reduced in thickness. Specifically, the under surface of the floor plate member may be recessed or cut out. Consequently, collision or contact between the vehicle's wheels and the floor plate member is reliably avoided even if the wheels move up and down while the vehicle is running on a road. The floor plate member may only be reduced in thickness in areas close to the lateral edges of the floor plate member since collision of the wheels against the floor plate member mostly occurs in these areas only.

BRIEF DESCRIPTION OF THE DRAWINGS

FIG. 24 depicts a bottom view of another floor structure according to the present invention;

FIG. 30 is similar to FIG. 22, illustrating a further modification;

FIGS. 31a to 31d are similar to FIGS. 23a to 23d respectively, illustrating further modifications;

DETAILED DESCRIPTION OF THE PREFERRED EMBODIMENTS

Now, preferred embodiments of the present invention will be described with FIGS. 1 through 34 of the accompanying drawings.

First Embodiment

Figure 1:
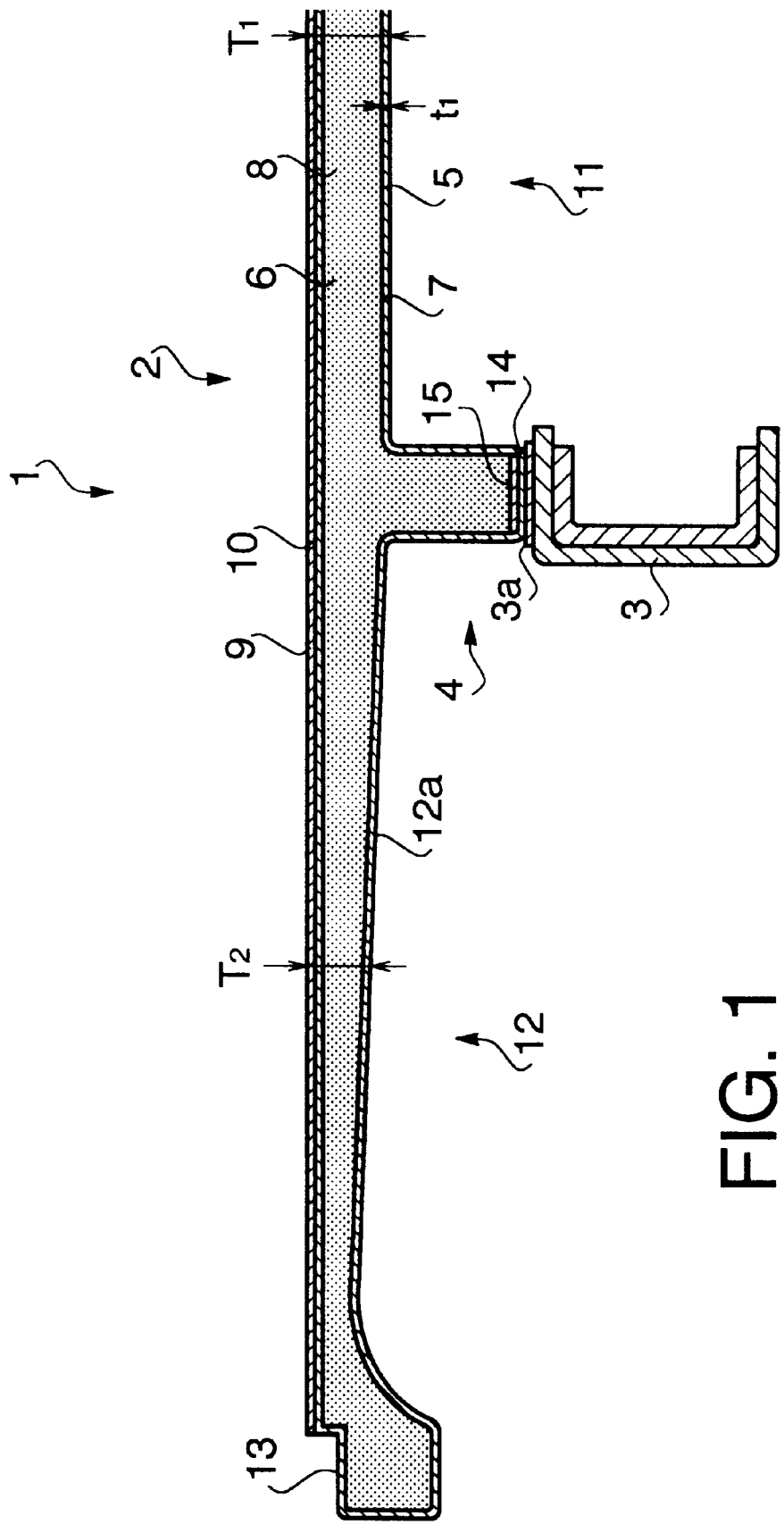
FIG. 1 illustrates an enlarged cross sectional view of a major part of a floor structure according to the first embodiment of the present invention together with a left side frame member of a truck which supports the floor structure on it.
Figure 2:
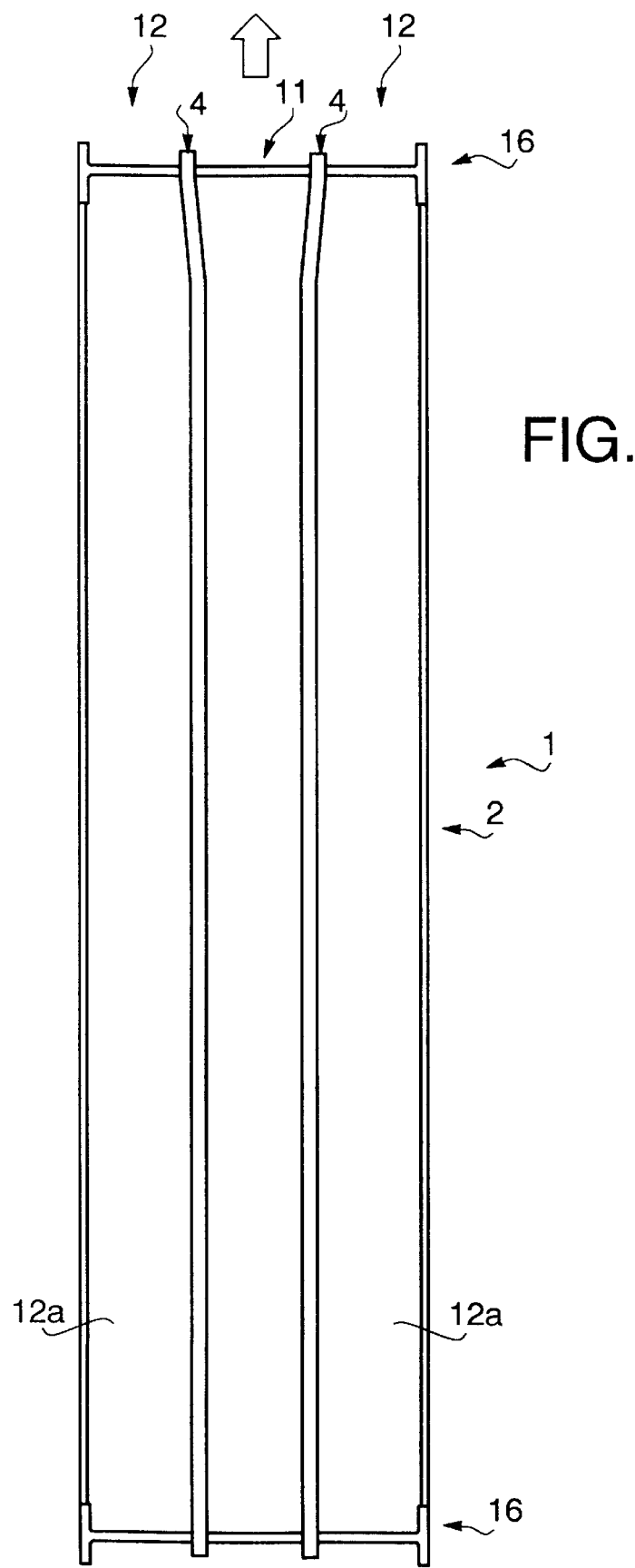
FIG. 2 illustrates a bottom view of the floor structure shown in FIG. 1.

Referring first to FIGS. 1 and 2, illustrated is a floor structure 1 for a load-carrying platform of a truck (not shown) according to a first embodiment of the present invention. The floor structure 1 includes a floor plate member 2 and a pair of parallel longitudinal sills 4 (only left one thereof is shown) underlying the floor plate member 2 and extending along a pair of side rails 3 (only one thereof is shown) of the truck. The floor plate member 2 and the longitudinal sills 4 are made from a glass fiber reinforced plastic (GFRP) 5. Each of the longitudinal sill portions 4 has a rectangular cross section.

The side rails 3 are longitudinal members of a ladder-like frame work of the truck and extend the length of the platform. These two side rails 3 extend in parallel and are spaced from each other in a width direction of the truck. A plurality of cross or transversal members (not shown) spans the side rails.

The floor structure 1 is secured on the side rails 3 via spacers 3a using suitable fastening members (not shown). Specifically, the longitudinal sills 4 are placed on the associated spacers 3a so that the floor structure 1 is supported from the side rails 3.

From another point of view, it can be said that the floor structure 1 is defined by a single outer shell 7 made from the GFRP having a generally constant thickness t1 and the outer shell 7 includes the floor portion 2 and the longitudinal sill portions 4. The outer shell 7 is a hollow and enclosed element. It should be noted that GFRP itself is heavy in specific weight, but the floor structure 1 is a hollow unit so that the weight of the floor structure 1 is very small. Further, the floor structure 1 has an enclosed construction so that it has significant rigidity. In particular, the longitudinal sill portions 4 extend the entire length of the floor plate portion 2 so that they serve as reinforcing members for the floor plate portion 2. As a result, the floor structure 1 has great flexural and torsional rigidity.

Inside the floor structure 1 or outer shell 7, provided is a resin foam 6 such as a urethane foam. The foam 6 functions as a core of the floor structure 1. The foam 6 is hard and brittle or fragile, i.e., it does not have great deformation resistance. However, the foam 6 can restrict deformation of the outer shell 7. Therefore, the rigidity of the floor structure 1 is improved by the core element 6. Since the rigidity of the floor structure 1 is insured by encapsulating the resin foam 6 in the outer shell 7, the wall thickness t1 of the outer shell 7 can be reduced. The thinner the wall thickness of the outer shell 7, the lighter the total weight of the floor structure 1. The foam 6 does not raise the total weight of the floor structure 7 considerably since its specific weight is small.

Now, a method of manufacturing the floor structure 1 will be described. First, the foam 6 is manufactured to have a shape which conforms with the floor plate portion 2 and longitudinal sill portions 4. In short, the core 8 is first provided. Then, a GFRP 5 is applied on the surface of the core 8 while the core 8 is in a soft condition. The GFRP 5 is hardened eventually to form the outer shell 7. Alternatively, the outer shell 7 may be first prepared and the resin foam may be injected into the shell 7 later. It should be noted that the resin foam 6 may be provided only in the floor panel portion 2 or in the longitudinal sill portions 4 or no resin foam may be provided in the outer shell 7 as far as the rigidity of the floor structure 1 is sufficient for a particular application or the rigidity is raised by employing an outer shell having a thicker wall.

The floor plate portion 2 spans the length and width of the platform. In this particular embodiment, the floor plate portion 2 has a laminated layer 10 made from a carbon fiber reinforced plastic (CFRP) 9 on its upper surface. After formation of the outer shell 7, the CFRP 9 is applied on the upper surface of the outer shell 7 while the CFRP 9 is in a soft condition. CFRP 9 is then hardened to form the layer 10 integral with the outer shell 7. The laminated layer 10 serves as the floor surface of the floor structure 1. This layer 10 provides a substantially perfect flat surface.

The thickness of the floor plate portion 2 is larger in an area 11 between the longitudinal sills 4 (or a center area of the floor plate portion 2) (T1) than in areas 12 outside the longitudinal sills 4 (T2) (lateral areas of the floor plate portion 2: one of the areas 12 is shown). A lower surface 12a of the outer shell 7 in each lateral area 12 is inclined in the width direction of the floor structure 1 such that the outer shell 7 is reduced in thickness T2 toward the lateral edge of the floor structure 1 (as it goes left in FIG. 1).

At each lateral end of the outer shell 7, the lower surface of the outer shell 7 is bent downward such that each lateral end 13 of the outer shell 7 becomes an enlarged thicker portion. An upper surface of this enlarged portion 13 is recessed to form a stepwise area for reception of a gate (not shown).

Inside the outer shell. 7, a CFRP layer 15 is provided on a lower surface 14 of each longitudinal sill portion 4. The CFRP layer 15 extends the length of the sill portion 4 in the longitudinal direction of the truck.

The upper surface layer 10 of the floor plate member 2 adds to the upper wall thickness of the outer shell 7 thereby increasing strength of the floor plate member 2. Likewise, the material 15 adds to the wall thickness of the lower portion 14 of the associated longitudinal, sill 4 thereby raising strength of the sill 4. The laminated materials 10 and 15 significantly improves rigidity of the floor structure 1, particularly rigidity against bending. It should be noted that the material 10 may be made from GFRP or CFRP. CFRP has greater rigidity and modulus of longitudinal elasticity (Young's modulus) than the GFRP.

The thickness T1 of the outer shell 7 in the center area 11 is larger than that T2 in the outer areas 12 so that the weight in the outer areas 12 can be reduced while raising the torsional rigidity of the floor structure 1. This construction also contributes to improvement of the overall frame rigidity of the truck and prevention of deformation of the floor structure 1 which would be otherwise caused by deformation of the truck frame.

The thickness T2 of the outer shell 7 is reduced in the outer areas 12 in the width direction as illustrated in FIG. 1, but the outer shell 7 outside the longitudinal sills 4 is sufficiently strong because of its cantilever structure, i.e., the outer portions 12 are rigidly supported from the center portion 11. The thickness reduction in the outer portions 12 contributes to weight reduction.

Figure 35:
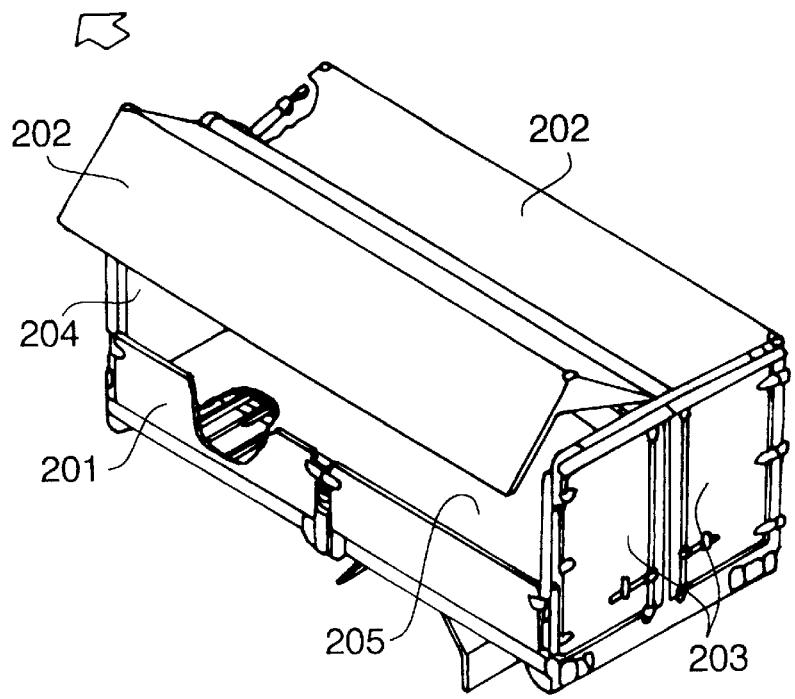
FIG. 35 illustrates a perspective view of a typical wing-body type platform of a truck.

As understood from FIG. 2, ribs 16 which are made from GFRP are formed along front and rear edges of the floor structure 1. Each rib 16 projects upward and downward beyond the outer shell 7 of the floor structure 1. A front wall, rear doors (FIG. 35) and the like are supported by these ribs 16.

Figure 36:
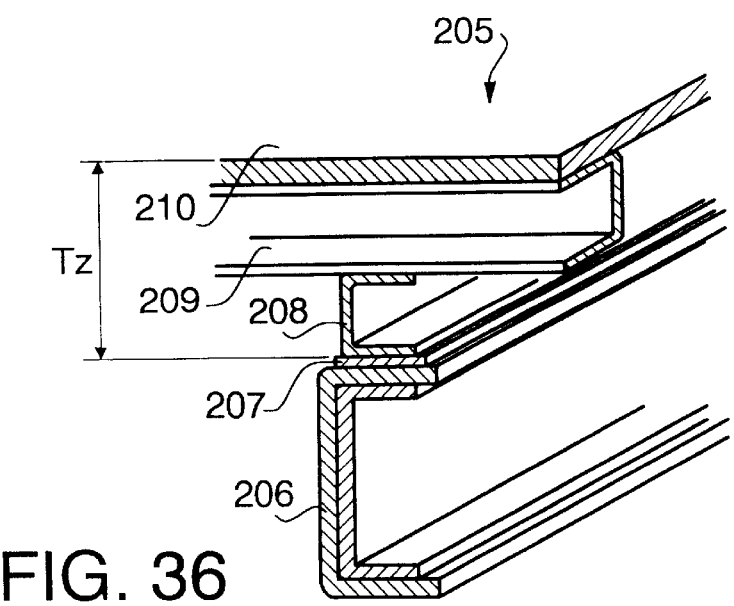
FIG. 36 illustrates partly in cross section a fragmentary perspective view of a conventional floor structure used in the truck shown in FIG. 35.

Since the floor structure 1 of the present invention is more rigid than the conventional structure, the thickness of the entire floor structure can be reduced. Specifically, the thickness of the floor structure is reduced by an amount which substantially corresponds to the transversal sill 209 in FIG. 36. Consequently, the height from the ground to the platform floor can be reduced. The lower the platform floor, the easier the loading and unloading of stuffs onto and from the truck. In addition, the lower the platform floor, the larger the platform volume.

Since the floor structure 1 has a hollow construction and is made from a material lighter than the steel and wood, great weight reduction is achieved.

Since the surface of the floor plate member portion 2 and that of the longitudinal sill portions 4 are smooth and substantially planar, a ratio of surface to volume of the floor structure 1 is reduced to minimum. Thus, the amount of GFRP necessary to provide the outer shell 7 is minimized. This contributes to manufacturing cost reduction. In particular, GFRP is more expensive than the foam 6 and CFRP is more expensive than GFRP. CFRP is only used for the additional layers 10 and 15 of the floor structure 1 to reduce the cost at less as possible in this particular embodiment. Further, the expensive material is only used for those areas which really require such a material. Therefore, the material is used in a very cost effective manner.

In the conventional floor structure, the longitudinal sills, the transversal sills and the floor plate are joined with each other by bolts or the like. As a result, vibrations during running of the truck would cause relative positional shifting between these members. This results in creaking and chattering, which is in turn transmitted to the cab through the truck's frame and causes noises and vibrations in a passenger's room. The floor structure 1 of the invention does not have such a drawback since it has a single integrated construction. Therefore, the floor structure 1 of the invention can reduce noises and vibrations in the passenger's room and improves comfortableness or riding quality.

FIGS. 3 through 16 illustrate various modifications of this embodiment. The floor structures shown in FIGS. 3 through 13 are similar to that of the foregoing embodiment so that like reference numerals are assigned to like parts and different parts and construction will only be described below.

Figure 3:
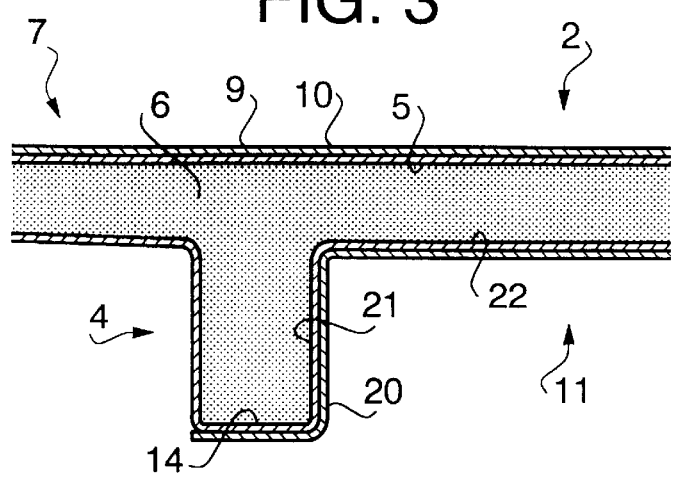
FIGS. 3 through 13 illustrate enlarged fragmentary cross sectional views of various modifications of the floor structure according to the present invention respectively.

The difference between the above embodiment and the modification shown in FIG. 3 lies in a fact that the layer 15 is not provided and another additional layer 20 is provided instead as illustrated. The layer 20 is made from CFRP and attached to the lower and inner surfaces 14 and 21 of each sill 4 and to a lower surface 22 of the center portion 11 of the outer shell 7. This construction can demonstrate substantially the same advantages as the foregoing embodiment. The area covered with the layer 20 is relatively larger so that the rigidity is further improved. That portion of the layer 20 which overlaps the lower surface 22 of the center portion 11 particularly improves the torsional rigidity of the floor structure 1 in cooperation with the opposite layer 10.

Figure 4:
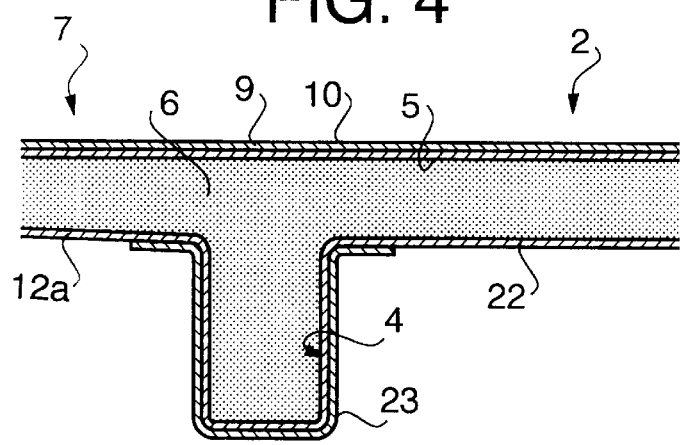

In FIG. 4, CFRP layer 23 is attached to the whole surface of each GFRP sill 4. The layer 23 also covers part of the lower surface 22 of the center portion 11 and part of the lower surface 12a of the outer portion 12 of the outer shell 7. The layer 23 improves the rigidity of the associated longitudinal sill 4 and the rigidity of the floor structure 1 as a whole.

Figure 5:
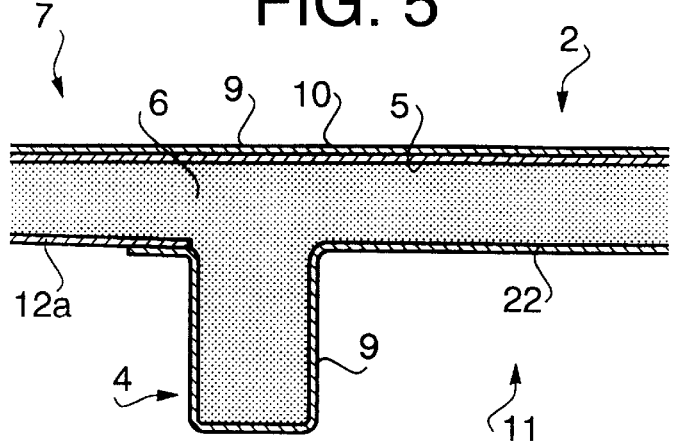

In FIG. 5, the lower plate 12a of the outer portion 12 of the outer shell 7 is cut at the place where the outer shell 7 joins the longitudinal sill 4 while the lower plate 22 of the central portion of the outer shell 7 is formed to be continuous to the longitudinal sill 4. Each CFRP longitudinal sill 4 is continuous to the CFRP lower plate 22 of the center portion 11 of the shell 7. The reference numeral 9 designates CFRP. This construction can demonstrate substantially the same advantages as the foregoing embodiment.

Figure 6:
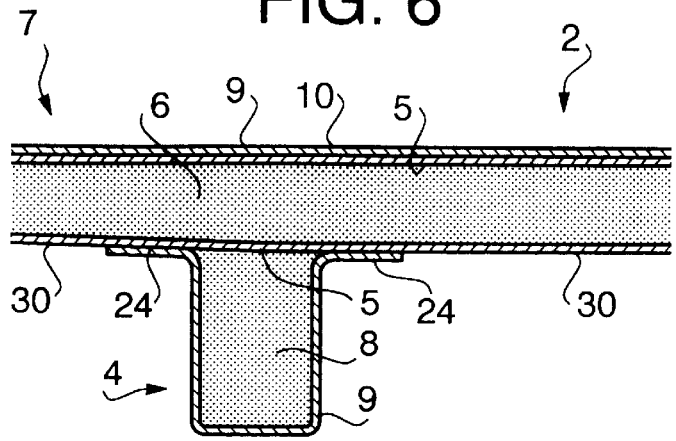

In FIG. 6, the lower plate of the center portion 11 is continuous to the lower plate 12a of the outer portion 12, i.e., a single GFRP plate 30 defines the lower plate of the outer shell 7. The two CFRP longitudinal sills 4 are separately manufactured and joined with the outer shell 7 later. A pair of horizontally extending flanges 24 of each sill 4 is joined with the lower plate 30 by thermal welding or deposition (vibration welding). This joining method is able to easily couple the GFRP 5 with the CFRP 9 in the hard condition. This modification also demonstrates substantially the same advantages as the foregoing embodiment.

Another method of joining the fiber reinforced plastic members is to apply an adhesive such as epoxy- or urethane-based adhesive or a molten resin between the plastic members. This joining method is also applicable to connection between the foam materials 6. The foam 6 can be joined with the fiber reinforced plastic by the above-mentioned adhesives.

Figure 7:
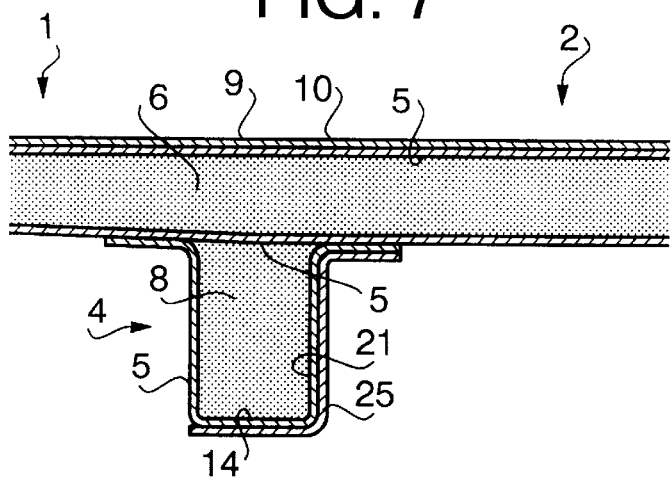

In FIG. 7, the floor panel 2 and the longitudinal sills 4 are separately manufactured and joined together later. The longitudinal sills 4 are made from GFRP. A layer 25 made from CFRP is attached to a lower surface 14 and an inner side surface 21 of each longitudinal sill 4. The floor structure 1 of this modification also demonstrate substantially the same advantages as the foregoing embodiment.

Figure 8:
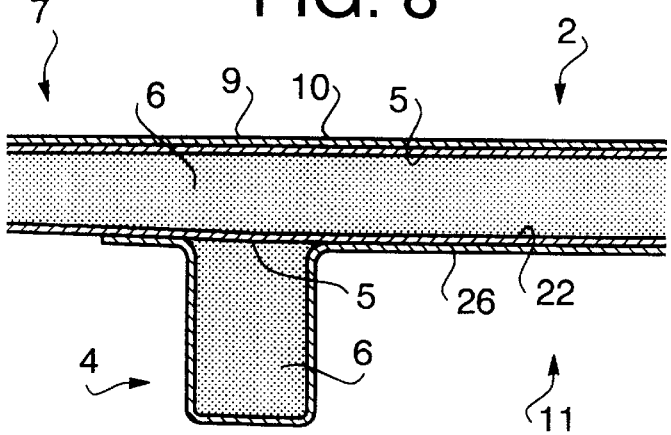

In FIG. 8, the floor panel 2 and the longitudinal sill portion 4 are also separately manufactured and joined later. The longitudinal sill portion 4 is a one-piece unit and is made from CFRP. The sill portion 4 has two downwardly projecting "humps" supported on the side rails (not shown). The sill portion 4 has a planar part 26 which connects the humps and is attached to the lower surface 22 of the center portion 11 of the outer shell 7. This modification demonstrates substantially the same advantages as the foregoing embodiment.

Figure 9:
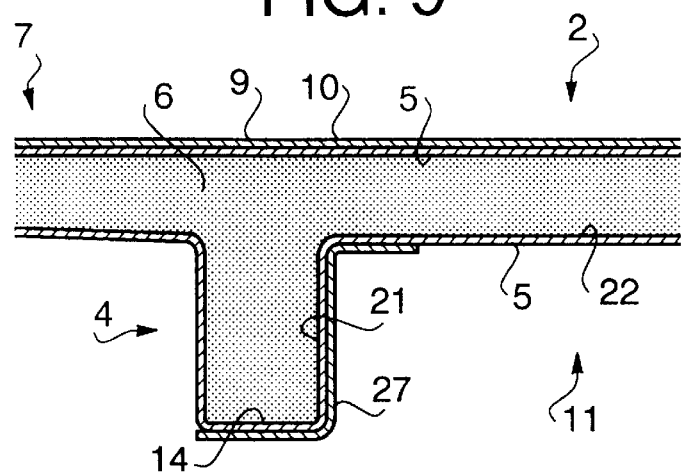

In FIG. 9, the floor panel 2 and the longitudinal sills 4 are made simultaneously using GFRP 5 such that they are continuous to each other. After that, a CFRP layer 27 is attached to the lower and side portions 14 and 21 of each sill portion 4. The CFRP layer 27 also extends over the underside 22 of the center portion 11 of the outer shell 7. This modification demonstrates substantially the same advantages as the foregoing embodiment.

Figure 10:
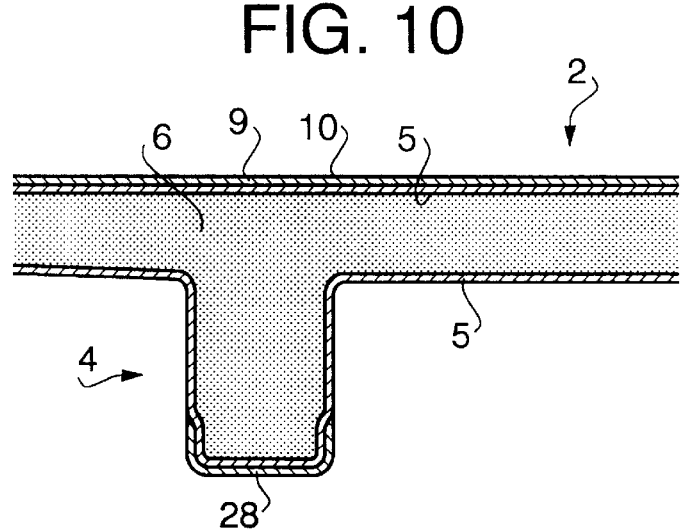

In FIG. 10, the floor panel 2 and the longitudinal sills 4 are also made to be continuous. The lower portion of each sill 4 is reduced in width and a CFRP layer 28 is attached over that portion such that the CFRP layer 28 defines a smooth surface. This modification demonstrates substantially the same advantages as the foregoing embodiment.

Figure 11:
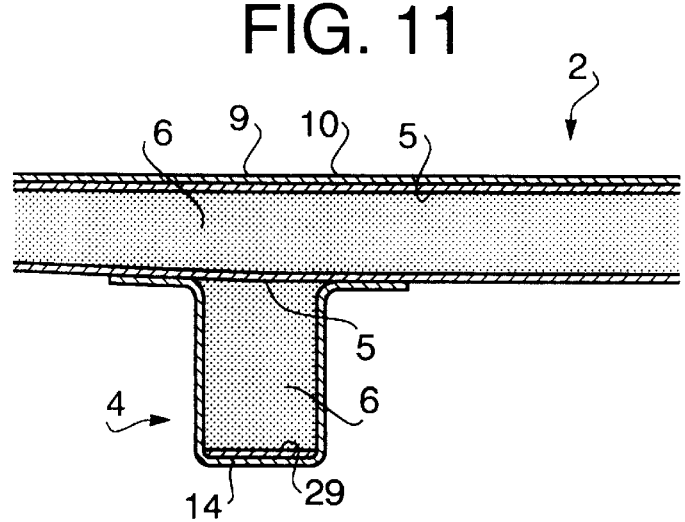

In FIG. 11, the GFRP floor panel 2 and longitudinal sills 4 are manufactured separately and joined later. A layer 29 made from CFRP is attached to an inner wall of the lower portion 14 of each longitudinal sill 4. This modification demonstrates substantially the same advantages as the foregoing embodiment.

Figure 12:
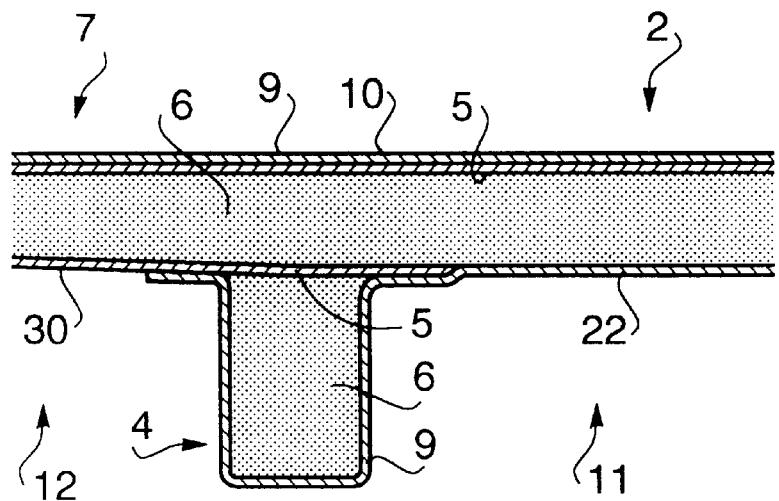

In FIG. 12, the lower wall 30 of the outer portion 12 of the GFRP floor panel 2 extends over the associated longitudinal sill 4 and reaches the center portion 11. Each sill portion 4 is made from CFRP. Part of each sill portion 4 overlaps the end of the lower wall 30, bends downwardly like a hump and overlaps the lower wall 30 again. The sill portions 4 are continuous to the lower wall 22 of the center portion 11 of the floor panel 2. This modification demonstrates substantially the same advantages as the foregoing embodiment.

Figure 13:
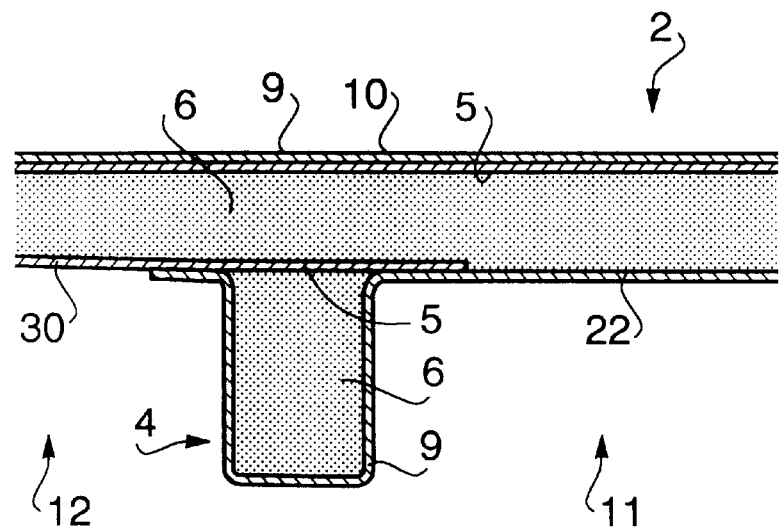

FIG. 13 is similar to FIG. 12. In FIG. 13, part of each longitudinal sill portion 4 also overlaps the end of the lower wall 30 of the outer portion 12 of the floor panel 2. The sill portions 4 are made from CFRP. The way the lower wall 30 overlaps the associated sill portion 4 is different from FIG. 12. Specifically, the sill portion 4 is linearly continuous to the lower wall 22 of the center portion 11 of the floor panel 2 in FIG. 13 whereas the sill portion 4 is stepwise continuous to the lower wall 22 in FIG. 12. This modification also demonstrates substantially the same advantages as the foregoing embodiment.

Figure 14:
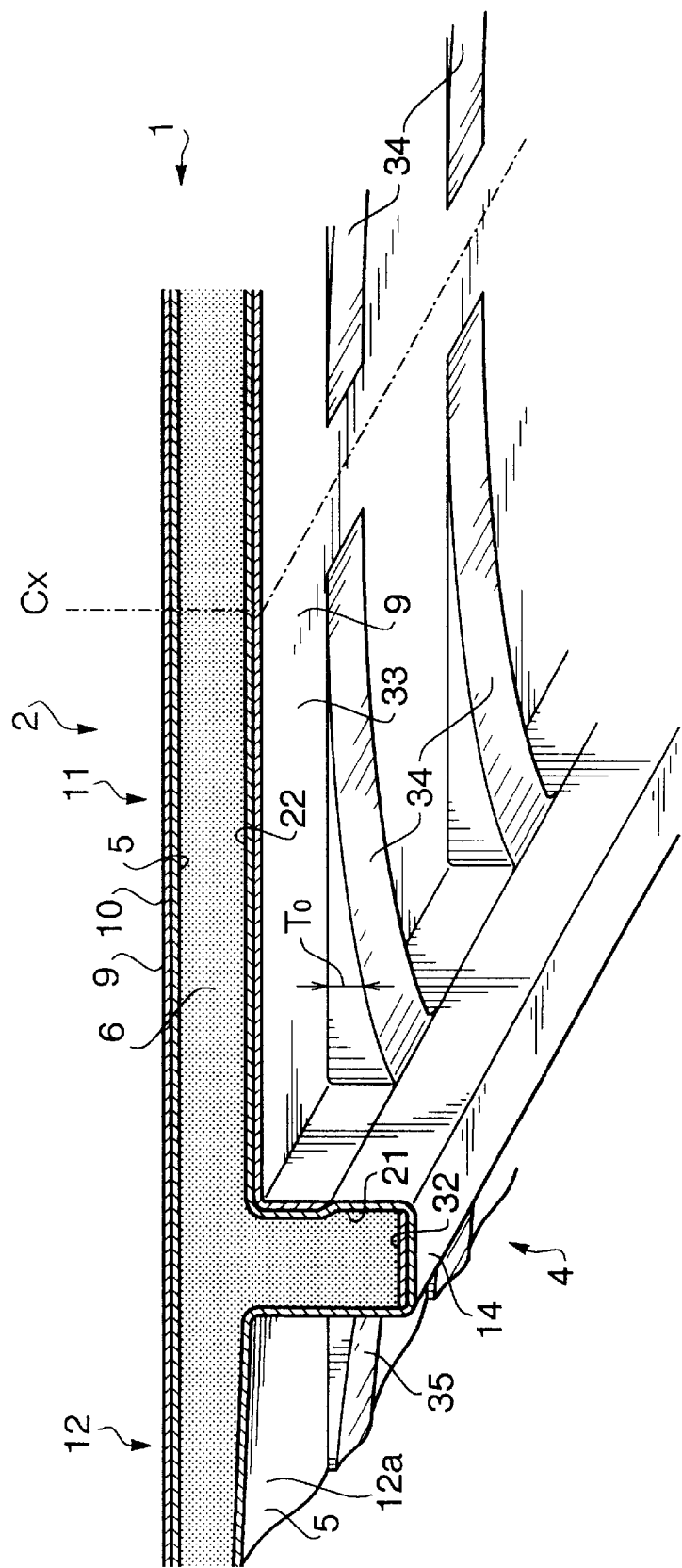
FIG. 14 is a fragmentary perspective view of another modification of the floor structure according to the present invention.

In FIG. 14, each of the longitudinal sill portions 4 has a CFRP layer 32 on its inner surface of the lower portion 14. Likewise, the center portion 11 of the floor panel portion 2 has a CFRP layer 33 on its outer surface of the lower wall 22. The CFRP layer 33 bends downward at ends such that these bending ends partly overlap the inner side wall 21 of each sill portion 4. In particular, the CFRP layer 33 includes ribs 34 extending in right and left directions from the longitudinal center line Cx of the floor panel portion 2 as well as in downward direction. The ribs 34 are formed at predetermined intervals in the length direction of the floor panel portion 2. Similar ribs 35, which are made from GFRP or CFRP, are formed on the lower surface 12a of each outer portion 12 of the floor panel 2. The ribs 35 extend from the longitudinal sill portions 4 to the vicinity of the lateral edges (not shown) of the floor panel 2 in the width direction of the floor panel 2. The ribs 34 may be made from CFRP 9 or GFRP 5. The foam 6 is provided inside each of the ribs 34 and 35.

The thickness To of the ribs 34 decreases toward the center line Cx from the longitudinal sill portions 4. Likewise, the thickness of the ribs 35 decreases toward the lateral edges of the floor panel 2 from the longitudinal sill portions 4. The lower surface of each of the ribs 34 and 35 defines a gentle arc. In this particular modification, the number of the ribs 34 and 35 should be as small as possible to reduce the total weight of the floor structure 1, and therefore the floor panel 2 has the minimum number of projections and recesses.

Figure 15A:
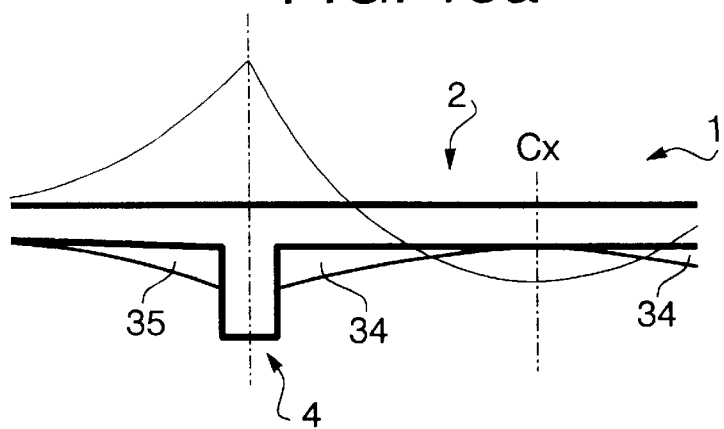
FIG. 15a is a graph of a bending moment acting on the floor structure shown in FIG. 14.
Figure 15B:
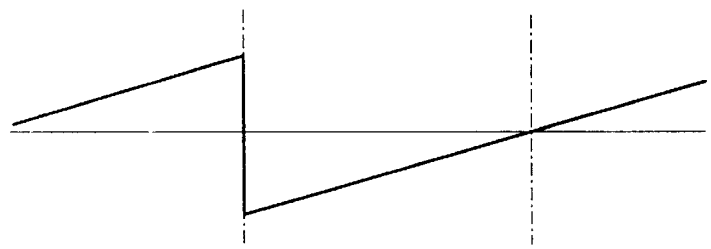
FIG. 15b is a graph of a shearing stress acting on the floor structure shown in FIG. 14.

FIG. 15a illustrates a bending moment applied to the floor structure 1 and FIG. 15b illustrates a shearing stress applied to the floor structure 1. As understood from these graphs, both the bending moment and the shearing stress take the maximum values at the longitudinal sill portions 4 respectively and decrease gradually as the measuring point leaves from the sill portions 4 in the transversal direction. As described above, the thickness To of the ribs 34 and 35 (FIG. 14) is determined to have the maximum value at the sill portions 4 and decreases as the measuring point leaves from the sill portions 4. Therefore, it is possible to provide necessary and sufficient rigidity against the applied moment and stress while suppressing increase of the weight as small as possible. It should be noted that the ribs 34 may be formed to be thicker in the vicinity of the center line Cx of the floor panel portion 2 and/or a larger number of ribs 34 may be provided if a larger load acts on the center line area than normal.

The construction shown in FIG. 14 may be applied to any floor structure described above. Further, side bumpers may be formed under the floor structure 1 using the ribs 35.

Figure 16:
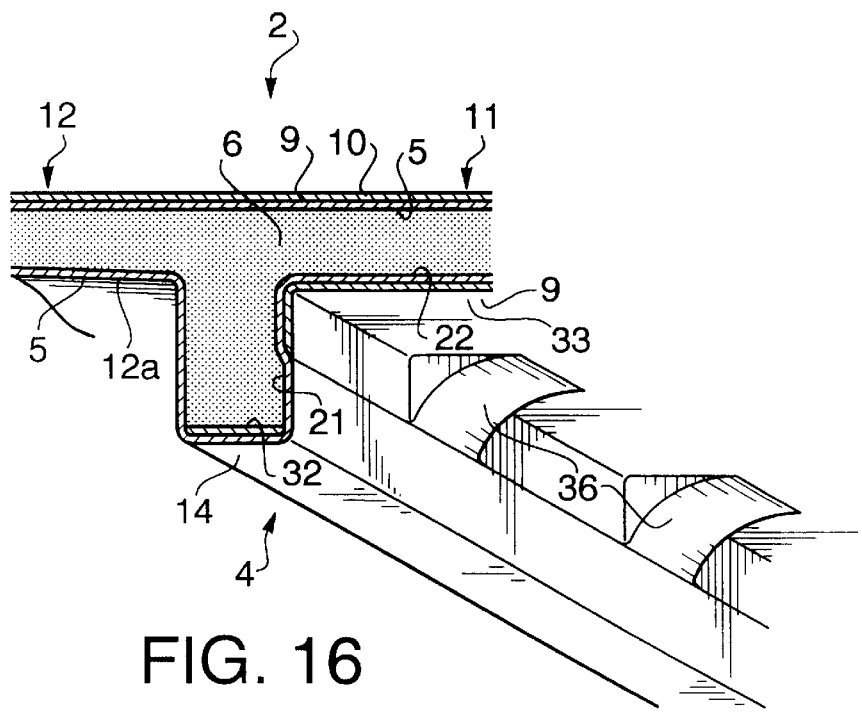
FIG. 16 illustrates a fragmentary perspective view of another modification of the floor structure.

In FIG. 16, a plurality of fillet-like ribs 36 is attached to both sides of each sill portion 4. (In the drawing, the ribs 36 on the inner side are only illustrated.) The illustrated rib 36 is smaller than the ribs 34 and 35 in width since this size is generally enough to insure desired rigidity.

It should be noted that all or some parts of the floor structure 1 may be made from CFRP. In addition, the laminated material may be made from GFRP. Further, more than one layer may be superposed at a particular portion of the floor structure 1. Moreover, the constructions shown in FIGS. 1 through 16 may be arbitrarily combined as needed for a particular application. The floor structure 1 may have no multi-layer portion if the strength of the floor structure 1 is sufficient.

Second Embodiment

A second embodiment of the present invention will be described with reference to FIGS. 17 through 34.

Figure 17:
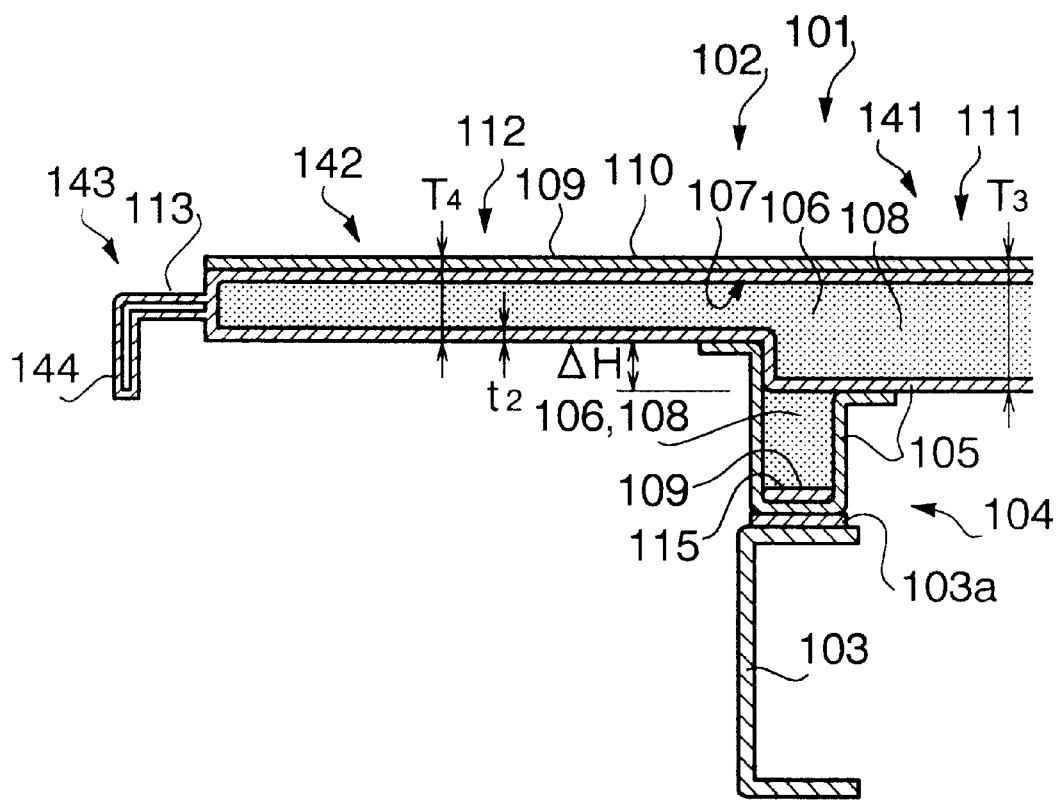
FIG. 17 illustrates a fragmentary sectional view of a floor structure according to the second embodiment of the invention, which is a cross section taken along the line 17—17 in FIG. 18.
Figure 18:
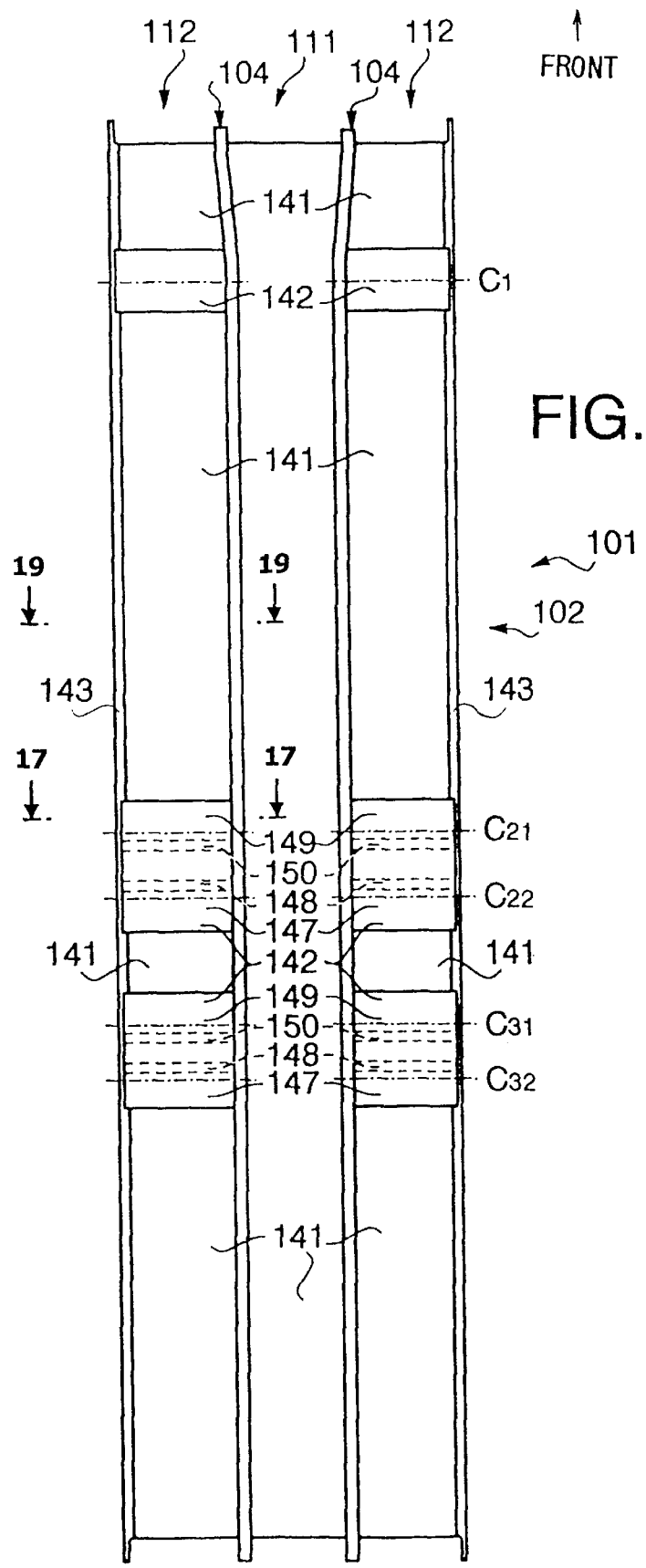
FIG. 18 is a bottom view of the floor structure shown in FIG. 17.
Figure 19:
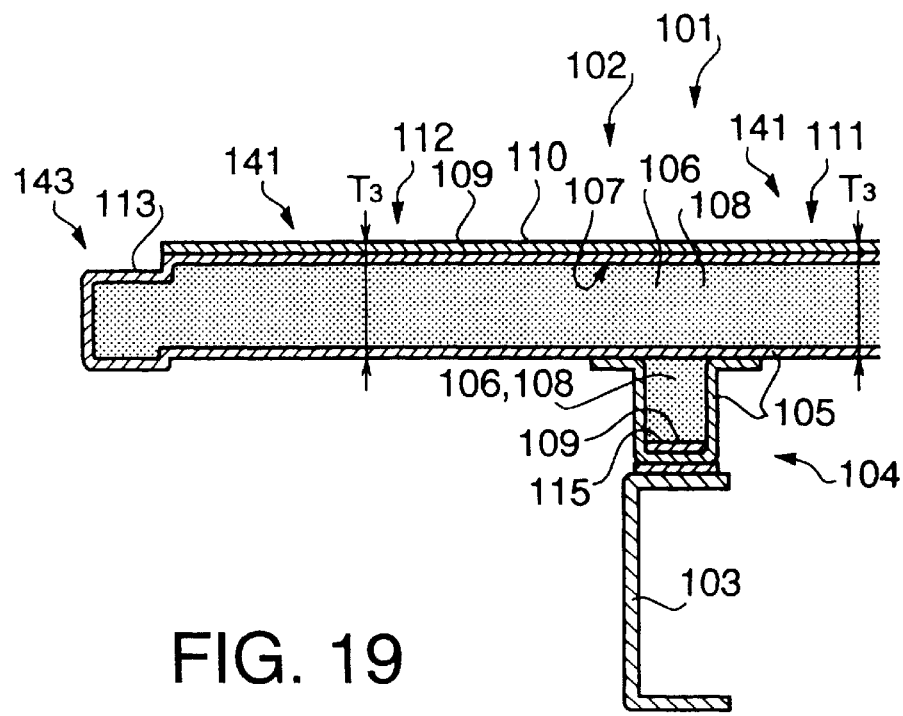
FIG. 19 is a cross section taken along the line 19—19 in FIG. 18.

FIG. 18 illustrates the bottom view of a floor structure 101 of this embodiment, FIG. 17 illustrates the sectional view as taken along the line A—A of FIG. 18 and FIG. 19 the sectional view as taken along the line 19—19. The top of the drawing sheet for FIG. 18 corresponds to the front of the truck. The floor structure 101 is employed in, for example, a wing-body type platform.

The floor structure 101 includes a floor panel 102 which defines a floor of the platform and a pair of longitudinal sills 104 extending along the side rails 103 of the truck under the floor panel 102. The floor panel 102 is a single thin and hollow element made from a glass fiber reinforced plastic (GFRP) 105. The floor panel 102 therefore has an enclosed construction. The longitudinal sills 4 are also made from GFRP. Each of the longitudinal sills 4 has a generally U-shaped cross section. The floor structure 101 has a hollow box shape having a GFRP outer shell 107 of generally uniform thickness t2. Accordingly, the floor structure 101 is lightweight and possesses high rigidity. The floor structure 101 therefore has a thin wall construction as a whole so that the floor height of the platform from the ground may be lowered. The longitudinal sills 104 add to rigidity of the floor panel 102 against bending and twisting (or torsion) in a pitching direction. Consequently, the floor structure 101 can prevent deformation of a truck frame, which deformation would be otherwise caused while the truck is running on a road, and can raise the rigidity of the truck frame. The interior of the outer shell 107 is filled with a foam 106 such as urethane foam or resin foam. The foam material 106 defines a core 108 of the floor structure 101 to improve compression strength of the floor structure 101.

The two side rails 103 of the truck are longitudinal members of a ladder-like frame work of the truck and extend the length of the floor structure 101. The side rails 103 are spaced from each other in the width direction of the truck. A plurality of cross members (not shown) spans the side rails 103. In FIG. 17, only the left side rail 103 is depicted.

The floor structure 101 is secured on the side rails 103 via spacers 103a by suitable fastening elements such as bolts and nuts. The floor structure 101 is therefore supported from the side rails 103 upon fixing of the longitudinal sills 104 to the spacers 103a.

The floor panel 102 and the longitudinal sills 104 are separately prepared and joined later. One method of manufacturing the floor panel 102 is to first prepare the foam 106 and then attach the GFRP 105 on the surface of the foam 106 to surround or enclose the foam 106. After that, a pair of foam materials 106, which is the basic material for the longitudinal sills 104, is attached to the under face of the floor panel 102 and the GFRP 105 is attached over the foam materials 106 to form the longitudinal sills 104. As a result, the floor panel 102 and longitudinal sills 104 are united to a single unit. In this particular embodiment, an additional material 110 made from CFRP 109 is attached to the whole upper surface of the floor panel 102 and a similar material 115 made from CFRP 109 is attached to an inner wall of a lower portion of each sill 104. CFRP 109 is a material having a high longitudinal elasticity. These additional layers 110 and 115 significantly improve torsional and flexural rigidity of the floor panel 102 and longitudinal sills 104. The laminated layer 110 on the upper surface of the floor panel 102 provides a smooth and planar floor surface of the platform.

The floor panel 102 extends the length and width of the platform and has a thickness T3 in most part thereof and a thickness T4 in those parts which face truck's wheels. Referring to FIG. 18, positions of the truck's wheels under the platform are designated by C1, C21, C22, C31 and C32. As best illustrated in this drawing, the outer portions 112 of the floor panel 102 are made only thinner (thickness T4 in FIG. 17) in first areas above the axles C1, C21, C22, C31 and C32. Other portions of the floor panel 102 have the same thickness T3 (FIG. 17) as a second area corresponding to the center portion 111 of the floor panel 102. In FIG. 17, which illustrates the cross section taken along the line 17—17 of FIG. 18, the floor panel 102 has the larger thickness T3 in the second area between the longitudinal sills 104 (or in a center portion 111 of the floor panel 102) and the smaller thickness T4 in the first area in the outer portions 112 of the floor panel 102.

As described above, the floor panel 102 includes the thicker portion 141 having the thickness T3 and the first area having thinner portions 142 having the thickness T4, but the thicker portion 141 and thinner portions 142 form in combination a planar upper surface of the floor panel 102. As a result, the lower surface of the thinner portions 142 is higher than the thicker portion 141 by delta H.

As described above, the floor panel 102 is recessed in its lower surface above the truck's wheels. When the floor structure 101 is assembled in the truck, the truck's wheels are positioned under the recessed portions of the outer portions 112 of the floor panel 102.

The floor structure 101 is applicable to various types of truck having different wheel bases. Specifically, if the truck is a four-axle vehicle, then an axle extending transversely below a cab of the truck (not shown) is a front front axle or first front axle which determines the steering of the truck, the axle C1 represents a front rear axle or second front axle which also determines the steering, the axle C22 represents a rear front axle or first rear axle and the axle C32 represents a rear rear axle or second rear axle. If the truck is a three-axle vehicle, then the truck includes the first front axle under the cab (not shown), the first rear axle C21 and the second rear axle C31. As understood from the above, even if the length of the floor structure 101 is equal, the four- and three-axle trucks may have rear axles at different positions. Further, the three-axle trucks may have different rear axle positions depending upon specifications of the truck, load balance, weight of the cab and the like to realize an appropriate truck design.

To cope with these variations of the trucks, the floor structure 101 has the following construction. The thinner portions 142 are formed in certain first areas above the second front axle C1, the first rear axles C21 and C22 and the second rear axles C31 and C32 respectively and each recessed portion 142 has a width equal to that of the associated outer portion 112 of the floor panel 102.

As illustrated in FIGS. 17 and 18, each outer portion 112 of the floor panel 102 has a support 143 for a gate (not shown) at a fifth area along a lateral edge thereof. The gate support 143 has greater rigidity than other portions to bear the weight of the gate. Specifically, the gate support 143 has a generally rectangular cross section along the thicker portions 141 of the floor panel 102 as illustrated in FIG. 19 and has a generally inverted L-shaped cross section along the thinner portions 142 as illustrated in FIG. 17. An inverted L-shaped core material 144 made from for example aluminum is embedded in the gate support 143 extending from the thinner portion 142. The gate is pivotably mounted on the associated gate support 143 using hinges or the like such that the gate can stand vertically in an upright position and pivot downwardly clockwise or counterclockwise. In the upright position, the gate stands on a stepwise portion 113 of the gate support 143.

Figure 20:
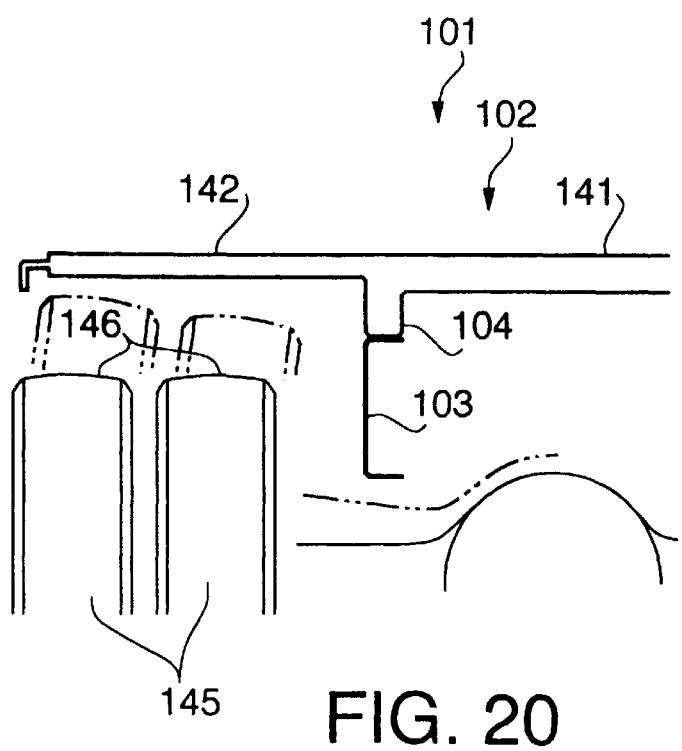
FIG. 20 illustrates a cross sectional view of the floor structure of the invention together with truck's wheels and a differential.

Referring to FIG. 20, since the floor panel 102 has the thinner portions 142 above the wheels 145 of the truck, the height of the floor panel 102 from the ground is raised at the thinner portions 142 only. Accordingly, the floor structure 101 is generally a low floor structure while maintaining sufficient rigidity. Even if the wheels 145 are forced upward, top portions 146 of the wheels 145 still do not collide with the floor panel 102 since a relatively large clearance is formed between the floor panel 102 and the wheel top 146.

Referring to FIG. 18, it should be noted that the length of the thinner portions 142 in the longitudinal direction of the truck for the rear front wheels (C21, C22) and the rear rear wheels (C31, C32) is unnecessarily long such that the illustrated floor structure 101 can be used for any of trucks having various types of wheel base. If the truck has the axles C1, C21 and C31 in addition to the axle under the cab, which may be referred to as a short wheel base truck, it is not necessary to consider interference or collision between the wheel top portions 146 and the floor panel 102 above the positions of the axles C22 and C32 since the truck does not have the axles C22 and C32. These portions are designated at 147. In other words, the portions 147 are unnecessarily thin and has low rigidity.

Accordingly, reinforcing ribs 148 are attached in third areas to the lower surfaces of the thinner portions 147 after the floor structure 101 is manufactured. Each rib 148 extends transversally. Therefore, the thinner portions 147 are raised in rigidity and undesired low rigidity portions are eliminated. A detailed structure about the rib 148 will be described later.

If the truck has axles C1, C22 and C32 in addition to the axle under the cab, which may be referred to as a long wheel base truck, on the other hand, the thinner portions 142 above the axles C21 and C31 may be able to have the same thickness T3 as the thicker portions 141. These portions are designated at 149 in FIG. 18. Similar reinforcing ribs 150 are attached in fourth area to the lower surfaces of the portions 149 in this case.

If the truck is a three-axle type having no second front axle C1, the reinforcing ribs 150 may be attached to the lower surfaces of the thinner portions 142 above the second front axle C1.

Since most of the floor panel 102 is made from the thicker portion 141 having the constant thickness, the floor structure 101 can be manufactured at lower cost and easily.

Various modifications will be described with reference to FIGS. 21 through 34. Similar reference numerals are used to designate similar components in similar areas in the different drawings and their descriptions will be omitted.

Figure 21:
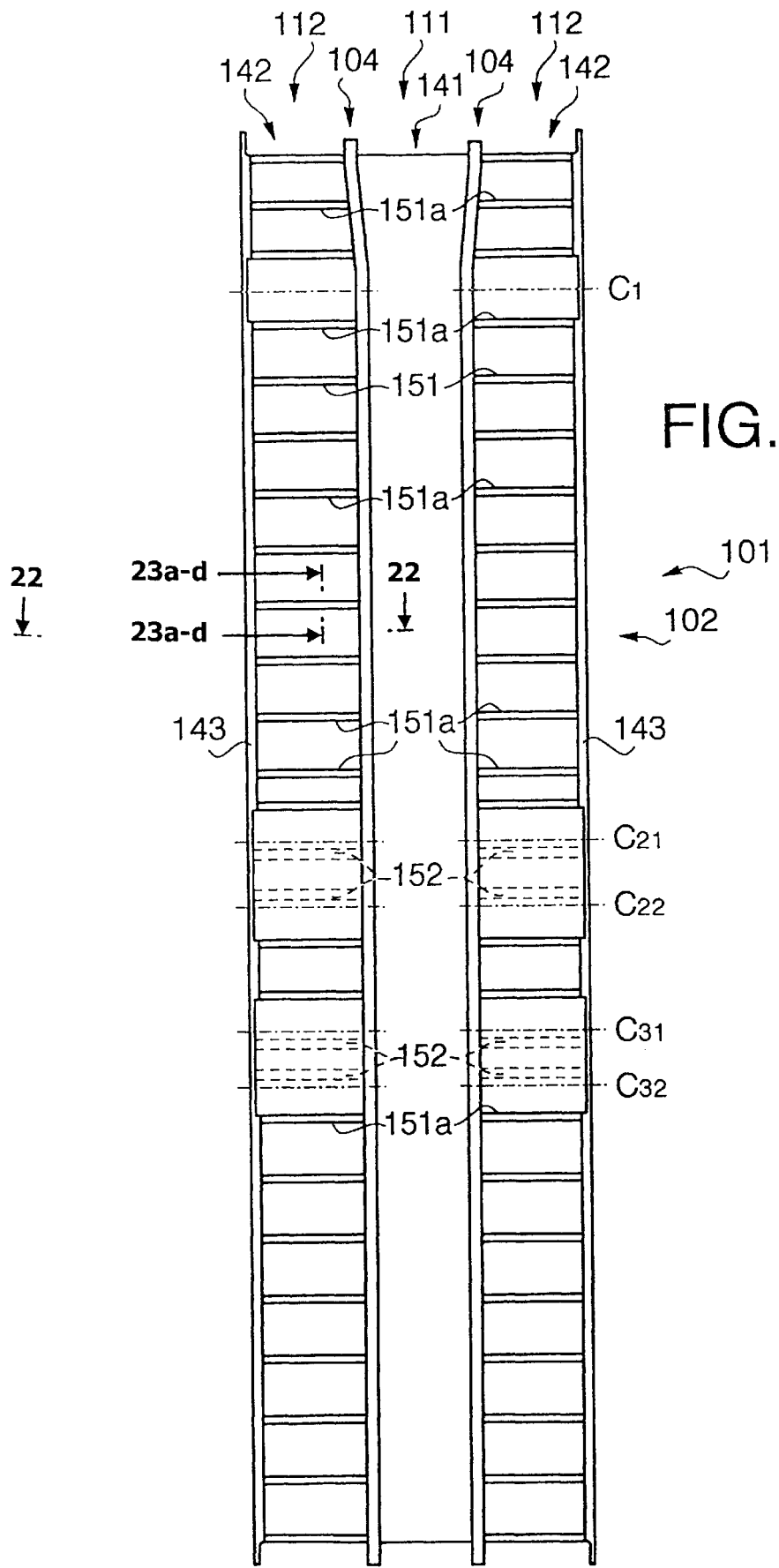
FIG. 21 illustrates a bottom view of another floor structure according to the invention.
Figure 22:
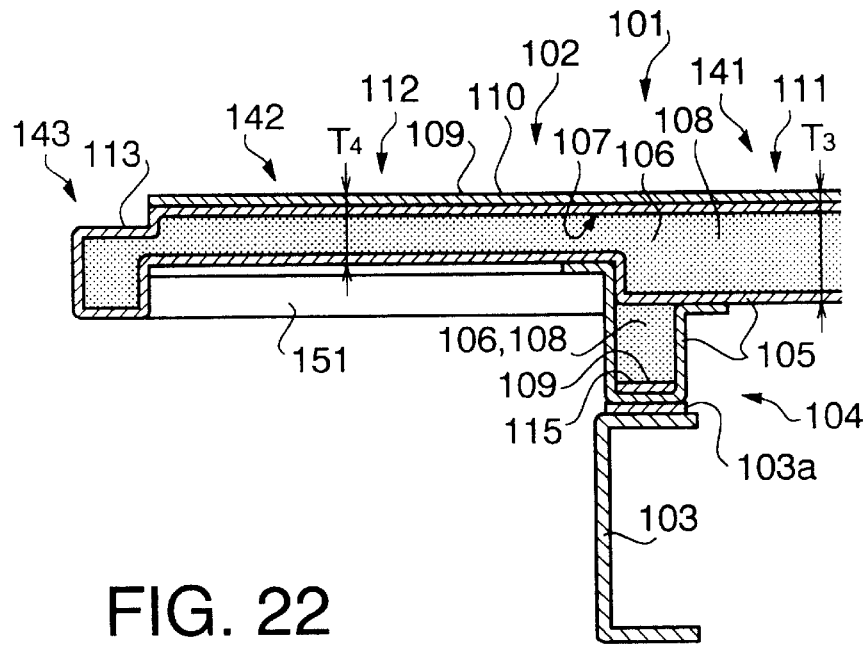
FIG. 22 is a cross section taken along the line 22—22 in FIG. 21.

FIG. 21 illustrates the bottom view of a floor structure 101 according to a first modification and FIG. 22 illustrates the cross section taken along the line 22—22 of FIG. 21.

The floor panel 102 has a center portion 111 of thickness T3 and outer portions 112 of thickness T4. This floor panel 102 also has the thicker portion 141 and the thinner portions 142. A number of ribs 151 is attached to the lower surface of each outer portion 112. Each rib 151 extends in the width direction of the truck. The ribs 151 are provided at predetermined intervals in the length direction of the truck. As best illustrated in FIG. 21, the outer portions 112 have the thickness T4 across their length and width entirely. In FIG. 18, on the contrary, the outer portions 112 have the thickness T4 only in the axle areas and other portions have the larger thickness T3. Therefore, this modification provides a thinner floor panel 102 as a whole than that shown in FIG. 18.

Those parts of the outer portions 112 of the floor panel 102 which are positioned above the axles C1, C21, C22, C31 and C32 of course have the smaller thickness T4. The ribs 152 may be attached to the lower surfaces of the floor panel 102 above the C21, C22, C31 and C32 as desired, like attachment of the ribs 148 and 150.

Figure 23A:
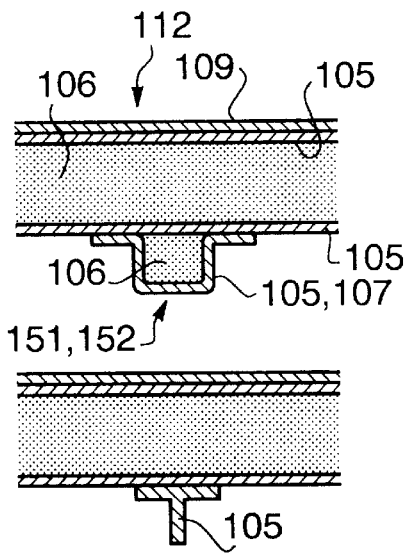
FIGS. 23a to 23d show cross sectional views taken along the line 23a–d—23a–d in FIG. 21 respectively, illustrating various shapes of ribs attached to the floor structure.

The various possible cross sections of the rib 151/152 are depicted in FIGS. 23a to 23d. FIG. 23a illustrates an example having a rectangular cross section. Each rib 151/152 is made from combination of the outer GFRP layer 107 and the inner foam 106. The ribs are provided on the lower surface of the outer portions 112 of the floor panel 102 in the same manner as utilized for provision of the longitudinal sills 4 onto the floor panel 102. It should be noted here that the outer layer 107 may be made from CFRP 109. In addition, the outer layer 107 may be formed from combination of GFRP layer 105 and CFRP layer 109.

Figure 23B:
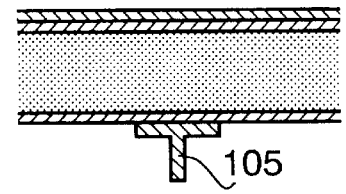
Figure 23C:
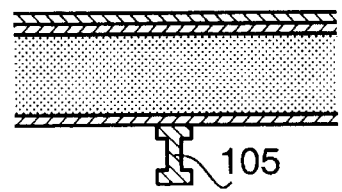
Figure 23D:
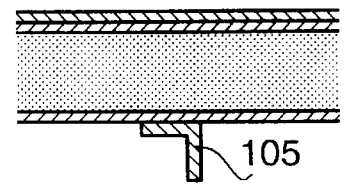

FIG. 23b illustrates an example of T-shaped one, FIG. 23c illustrates an example of I-shaped one and FIG. 23d illustrates an inverted L-shaped one. The ribs 151/152 are made from GFRP 105 and attached to the lower surface of the floor panel 102. It should be noted here that the material 105 may be replaced with CFRP 109 or the rib may be formed from combination of GFRP layer 105 and CFRP layer 109. It is of course that other particular shapes and materials may be equally employed for the ribs 151/152.

As seen in FIG. 21, the ribs 151 and 152 connect the associated longitudinal sill 4 with the associated gate support 143 and bear a vertical load applied to the gate support 143 from the mounted gate and related parts. In short, the ribs 151 and 152 significantly raise flexural rigidity of the outer portions 112 of the floor panel 102.

It should be noted that the construction of the ribs 148 and 150 are similar to the ribs 151 and 152.

Ribs designated at 151a may be used as the ribs 151 and brackets for mounting of accessory parts such as side bumpers, splash boards and mudguards.

Figure 25:
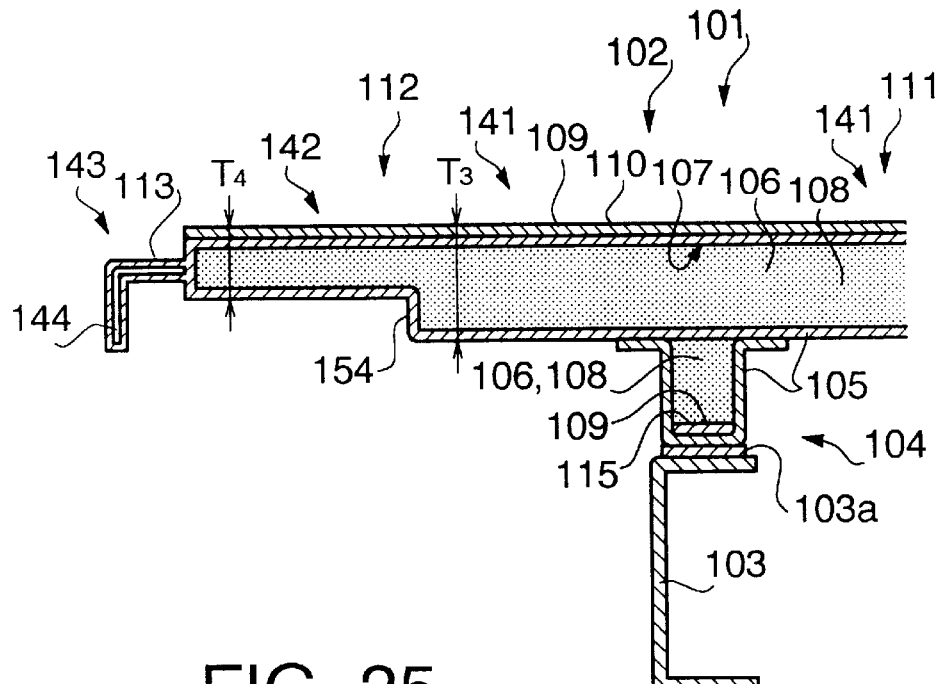
FIG. 25 depicts a cross section taken along the line 25—25 of FIG. 24.

FIG. 24 illustrates a bottom view of a floor structure 101 according to a second modification and FIG. 25 illustrates a cross sectional view taken along the line E—E.

The floor structure 101 includes a floor panel 102 having a center portion 111 and outer portions 112. The thickness of the center portion 111 is T3 entirely and the thickness of the outer portions 112 is mostly T3. As understood from FIG. 25, part 142 of the outer portions 112 has a smaller thickness T4. In other words, a majority of the floor panel 102 is made from a thicker panel portion 141, and the remainder of the floor panel is made from the thinner panel portions 142. The thinner panel portions 142 are provided at positions corresponding to a second set of front wheels (axle C1), a first set of rear wheels (axle C21/C22) and a second set of rear wheels (axle C31/C33) as illustrated in FIG. 24. It should be noted that the thinner portion 142 do not extend the width of the associated outer potion 112 from the lateral edge of the floor panel 102: it rather terminates before reaching the longitudinal sill 104. In short, the width of the thinner portions 142 of this modification is smaller than that of the thinner portions 142 shown in FIGS. 18 and 21 (i.e., reduced to approximately half). As understood from FIG. 25, the width of the thinner or recessed portions 142 is determined to be sufficiently large such that the truck's wheels (not shown) do not collide with the lower surface of the floor panel 102. Referring back to FIG. 20, specifically, the collision between the wheel top portions 146 and the overextending recessed portion 142 only occurs under about an outer quarter of the recessed portion 142. In the modification shown in FIG. 24, therefore, the floor panel 102 is only reduced in thickness in such an area. Since other part of the floor panel 102 is made from the thicker portion 141, the rigidity of the floor panel 102 is improved. As depicted in FIG. 24, the thinner portions 142 above the second front wheels supported on the axle C1 are wider than those above the first and second rear wheels supported on the axles C21 to C33 since the second front wheels are caused to turn right and left upon a steering operation by a driver of the truck and the interference between the floor panel 102 and the second front wheels should be avoided during such a steering operation.

On the under surface of the outer portions 112 of the floor panel 102, provided is a number of ribs 153 for mounting of accessory parts such as side bumpers. The ribs 153 are attached to the thicker portion 141 having relatively high rigidity so that the number of the ribs 153 can be reduced to as small as possible, as far as the ribs 153 can support the side bumpers safely thereon. It should be noted that the above described ribs 148, 150 and 152 may be provided on the thinner portions 142.

Figure 26:
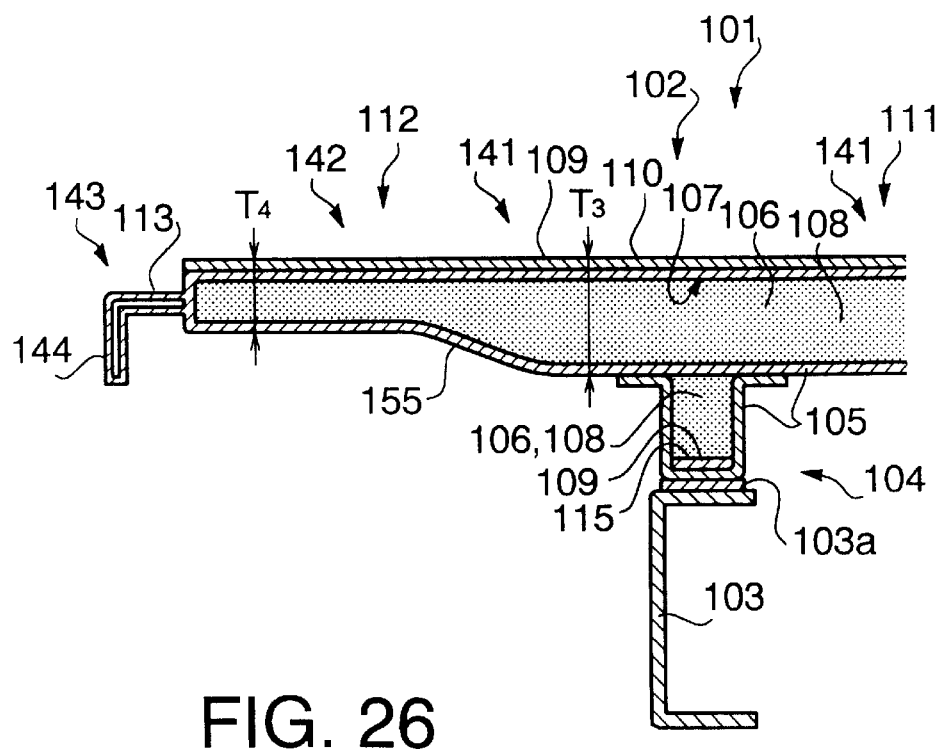
FIGS. 26 and 27 are views similar to FIG. 25, illustrating another modifications respectively.
Figure 27:
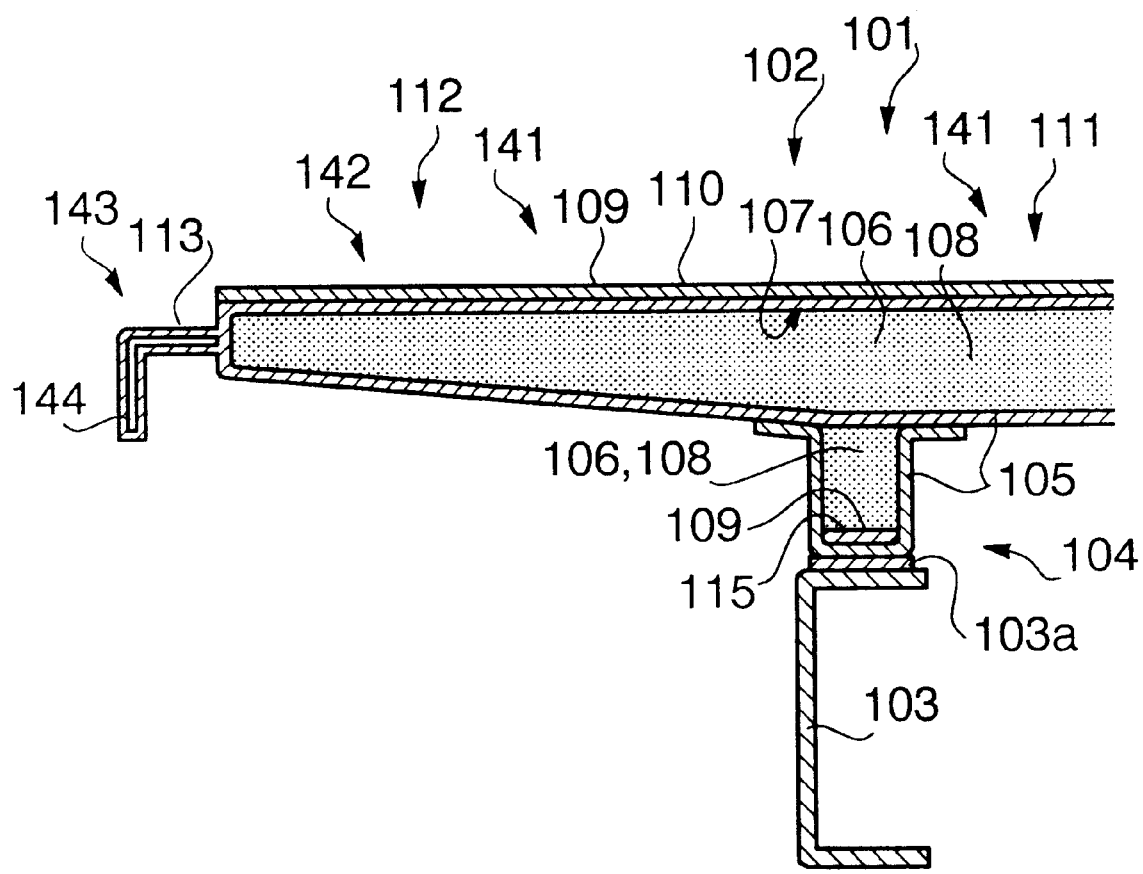
Figure 28:
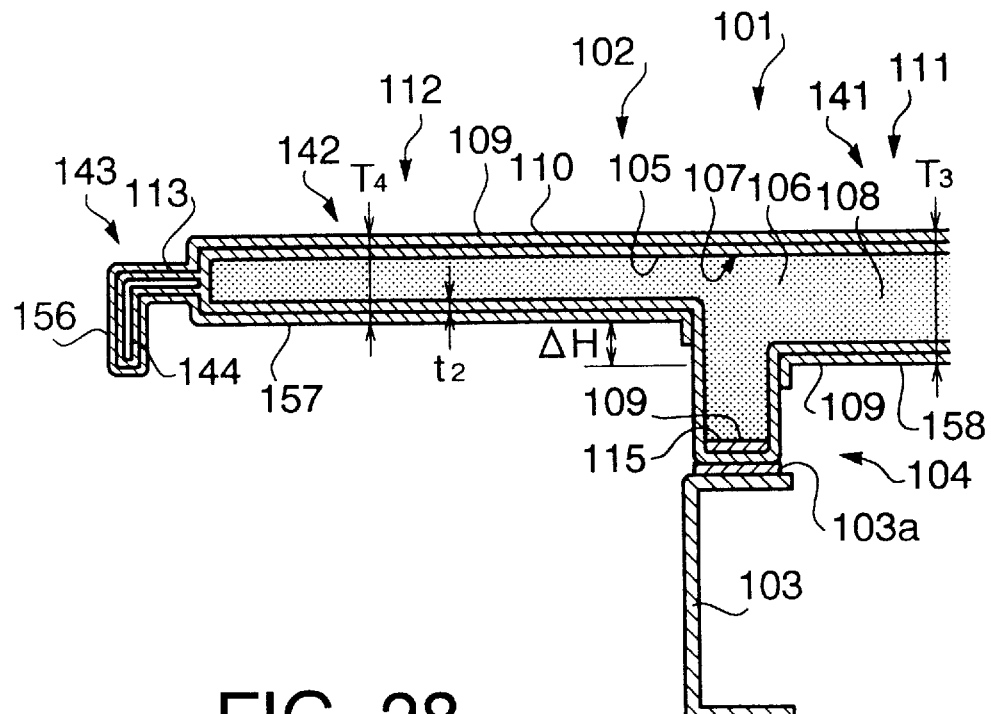
FIG. 28 is similar to FIG. 17, illustrating a further modification of the floor structure shown in FIG. 17.
Figure 29:
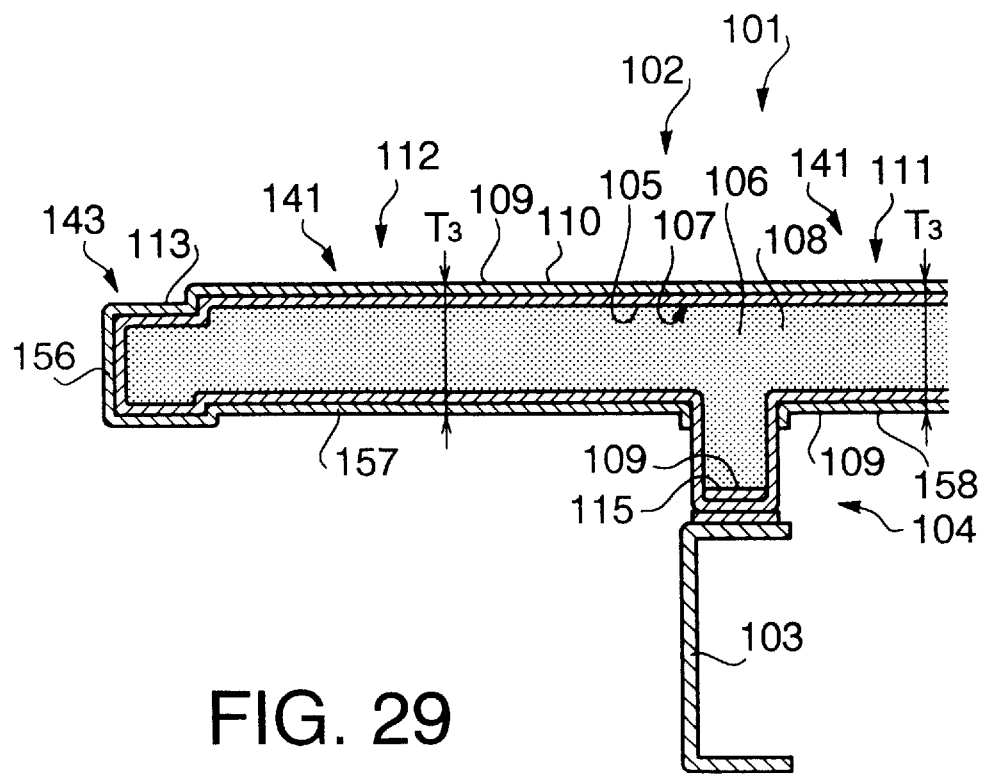
FIG. 29 is similar to FIG. 19, illustrating a further modification.
Figure 32:
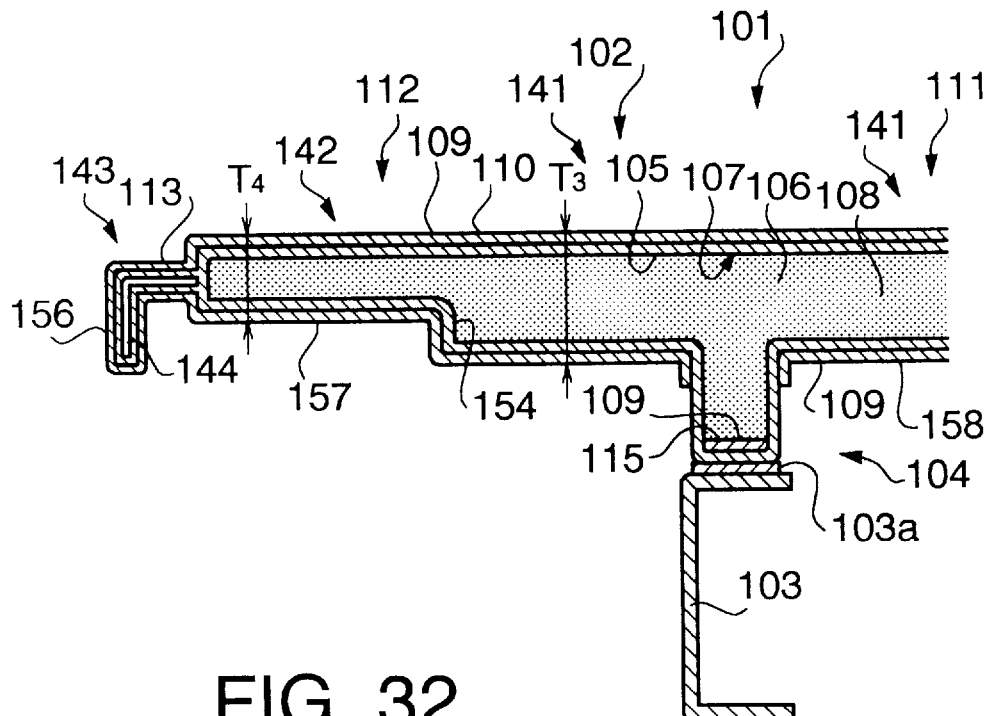
FIG. 32 is similar to FIG. 25, illustrating a further modification.
Figure 33:
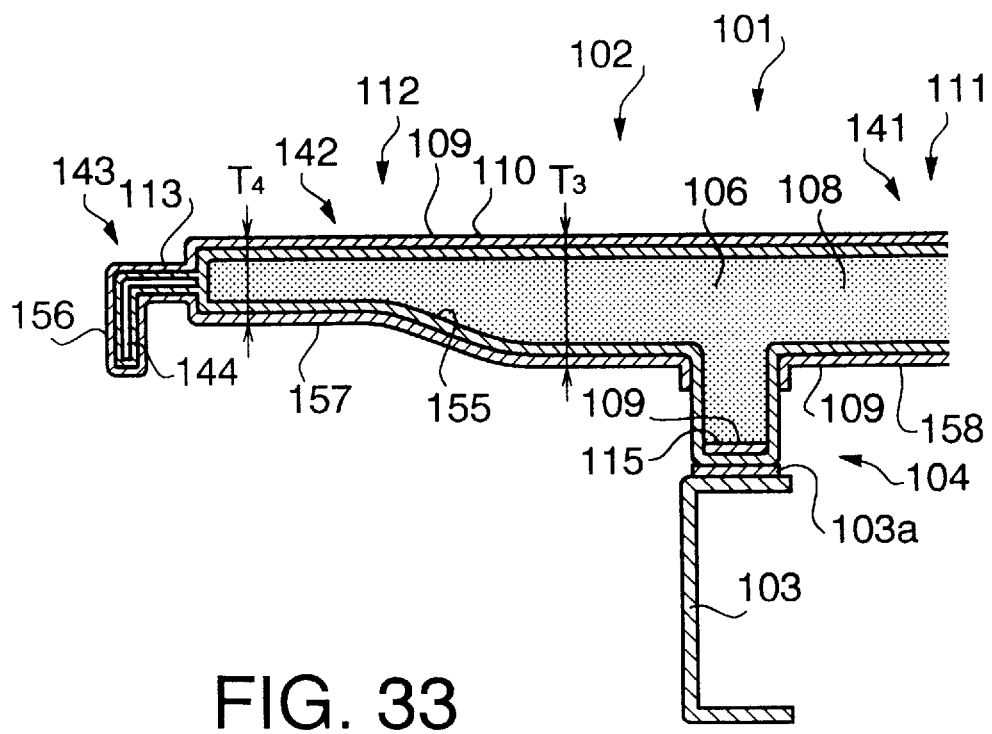
FIG. 33 is similar to FIG. 26, illustrating a further modification.
Figure 34:
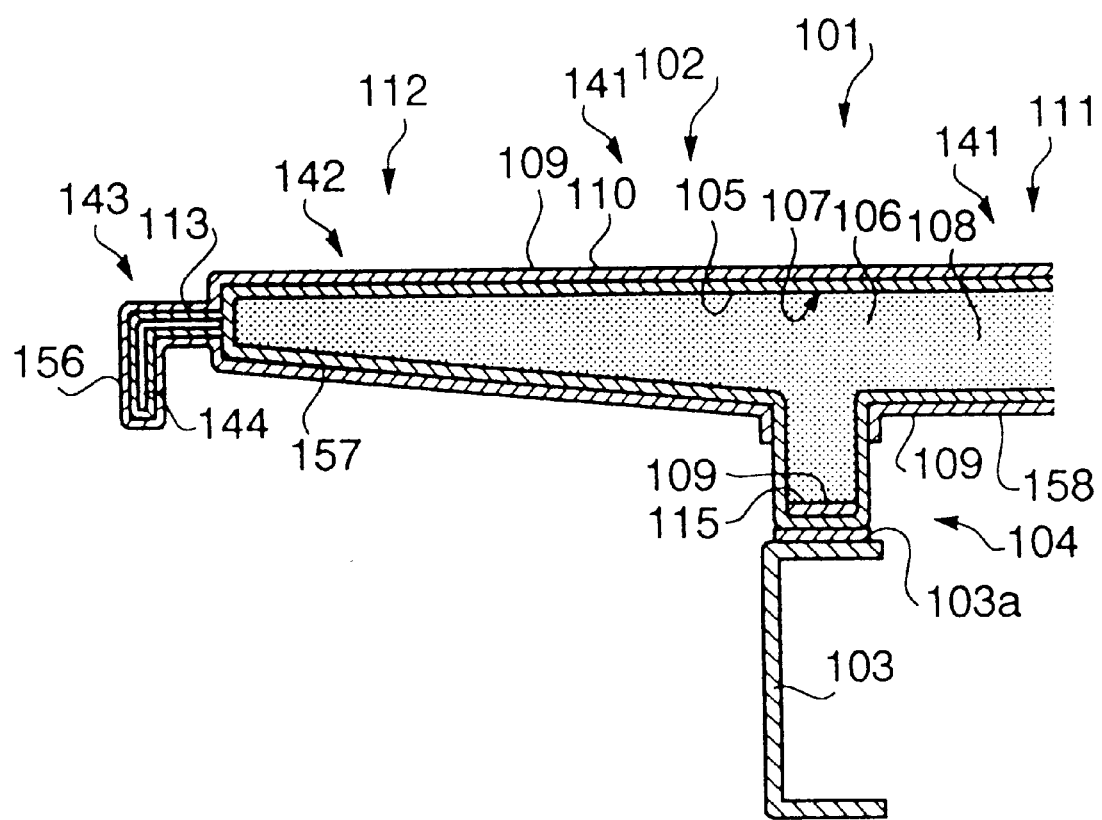
FIG. 34 is similar to FIG. 27, illustrating a further modification.

Referring to FIG. 25, a vertically extending sharp connection 154 is formed between the thinner portion 142 and the thicker portion 141 in this modification. However, the thinner and thicker portions 142 and 141 may be connected by a gentle transition 155 as illustrated in FIG. 26. The manufacturing of the floor panel 102 is easier in FIG. 26 than in FIG. 25. The outer portions 112 of the floor panel 102 may be reduced in thickness gradually linearly toward the lateral edges of the floor panel to form the thinner portion 142 as illustrated in FIG. 27.

Further modifications are illustrated in FIGS. 28 to 34. FIGS. 28 to 34 correspond to FIGS. 17, 19, 22, 23 and 25 to 27 respectively. In FIGS. 28 to 34, the floor panel portion 102 and the longitudinal sill portions 104 are made simultaneously as a one piece element whereas in FIGS. 17, 19, 22, 23 and 25 to 27, these portions are separately manufactured and jointed later. Specifically, the foam 106 is first prepared to have a shape of combined floor panel portion 102 and longitudinal sill portions 104. Then, the GFRP 105 is applied over the whole outer surface of the foam 106 such that the floor panel portion 102 and longitudinal sill portions 104 are enclosed by a single outer shell 107 made from the GFRP 105. The floor panel portion 102 and longitudinal sill portions 104 also share a mutual core 108 made from the foam 106.

In FIGS. 28 to 34, the laminated layer 110 made from the CFRP 109 covers not only the upper surface of the floor panel portion 102 but also the gate supports 143 and the lower surface of the outer portions 112 of the floor panel portions 102, thereby defining additional layers 156 and 157 continuously. In addition, the lower surface of the center portion 111 of the floor panel portion 111 is also covered with a layer 158 made from the CFRP 109.

Since the layers 156, 157 and 158 are added to the floor structure 101, the rigidity of the floor structure 101 is further improved.

Other modifications and changes may be made by those having an ordinary skill in the art without departing from the spirit and scope of the present invention. Further, any combination of the foregoing constructions may be possible as needed. In addition, teaching of the present invention can be equally applied to other types of truck such as those having three axles without the second front axle or without one of the rear axles.

What is claimed is:

1. A floor structure for a load-carrying platform of a truck, the truck having a pair of parallel side rails extending in a longitudinal direction of the truck and having a plurality of wheels, comprising:

a hollow floor panel made from fiber reinforced plastic, the floor panel part having an upper wall, a lower wall and lateral edge portions connecting the upper and lower walls wherein said floor panel includes a first thickness in a plurality of first areas above the plurality of wheels, and a second thickness in a plurality of second areas located between a pair of longitudinal sills and longitudinally in front and rear of said plurality of wheels, wherein said first thickness is less than said second thickness;

the pair of longitudinal sills extending along the pair of side rails under the floor panel part, each longitudinal sill being hollow and made from the fiber reinforced plastic;

wherein a thickness of the floor panel part is also reduced, relative to said second thickness, in a plurality of third areas adjacent to the first areas in the longitudinal direction of the truck and first ribs arc attached to the lower wall of the floor panel part in the third areas, each of the first ribs extending in the width direction of the truck, and further wherein the first thickness is substantially the same as the thickness of the third areas.

2. The floor structure of claim 1, wherein the plurality of first and third areas are outside the longitudinal sills.

3. The floor structure of claim 1, wherein the floor panel part is reduced in thickness relative to the second thickness in a plurality of fourth areas outside the longitudinal sills and a plurality of second ribs are attached to the lower wall of the floor panel part in the fourth areas, the second ribs being spaced in the longitudinal direction of the truck and each second rib extending in the width direction of the truck.

4. The floor structure of claim 1, wherein the floor panel part is reduced in thickness, relative to said second thickness in predetermined fifth areas close to the lateral edge portions.

5. The floor structure of claim 1, wherein a foam material is capsulated in at least one of the floor panel part and the longitudinal sills.

6. The floor structure of claim 1 further including a first laminated layer material placed on the upper wall of the floor panel part.

7. The floor structure of claim 6 further including a second laminated layer material attached to at least one of an outer and an inner surface of each longitudinal sill.

8. The floor structure of claim 7, wherein each longitudinal sill has a U-shaped cross section and is defined by first to third walls extending in the longitudinal direction of the truck respectively, the first wall being located horizontally outward in the width direction of the truck, the second wall being located horizontally inward in the width direction of the truck and the third wall being located vertically downward and connecting the first and second walls with each other at their lower ends to define the U-shaped cross section, and the second laminated layer material is attached to at least one of an outer and an inner surface of the third wall of each longitudinal sill.

9. The floor structure of claim 8, wherein the second laminated layer material is attached to the second wall of each longitudinal sill.

10. The floor structure claim 7 further including a third laminated layer material attached on the lower wall of the floor panel part between the longitudinal sills.

11. The floor structure claim 10 wherein each of the first, second, and third laminated layer material is made from a carbon fiber reinforced plastic.

12. The floor structure of claim 1, wherein each of the longitudinal sills is made from a carbon fiber reinforced plastic.

* * * * *